(12) United States Patent
Lee et al.

(10) Patent No.: US 12,053,692 B2
(45) Date of Patent: Aug. 6, 2024

(54) DISPLAY APPARATUS AND OPERATING METHOD THEREOF

(71) Applicant: SAMSUNG ELECTRONICS CO., LTD., Suwon-si (KR)

(72) Inventors: Jongin Lee, Suwon-si (KR); Sehyun Kim, Suwon-si (KR); Kilsoo Choi, Suwon-si (KR); Hyeeun Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 188 days.

(21) Appl. No.: 17/866,366

(22) Filed: Jul. 15, 2022

(65) Prior Publication Data
US 2023/0048793 A1    Feb. 16, 2023

Related U.S. Application Data

(63) Continuation of application No. PCT/KR2022/008309, filed on Jun. 13, 2022.

(30) Foreign Application Priority Data

Aug. 12, 2021  (KR) .................. 10-2021-0106942

(51) Int. Cl.
*A63F 13/23*         (2014.01)
*A63F 13/42*         (2014.01)
(52) U.S. Cl.
CPC .............. *A63F 13/23* (2014.09); *A63F 13/42* (2014.09); *A63F 2300/6045* (2013.01)
(58) Field of Classification Search
CPC ................................. A63F 13/22; A63F 13/23
See application file for complete search history.

(56) References Cited

U.S. PATENT DOCUMENTS 5,896,125 A  *  4/1999  Niedzwiecki ........... A63F 13/22
                                                                   463/36
8,187,095 B2    5/2012  Wong et al.
(Continued)

FOREIGN PATENT DOCUMENTS

EP      4 090 043 A1    11/2022
JP    2013-236909 A     11/2013
(Continued)

OTHER PUBLICATIONS

Written Opinion/International Search Report dated Oct. 4, 2022 for PCT/KR2022/008309.

*Primary Examiner* — Jay Trent Liddle
(74) *Attorney, Agent, or Firm* — Nixon & Vanderhye P.C.

(57) ABSTRACT

Provided are a display apparatus and/or an operating method thereof. The display apparatus may include: a display; a memory storing one or more instructions; and at least one processor configured to execute the one or more instructions stored in the memory to identify a device controller activated on the display apparatus and a device activated on the display apparatus, determine whether the identified device controller is compatible with the identified device, control, when it is determined that the identified device controller is compatible with the identified device, a control signal from the device controller to be directly provided to the device, and convert, when it is determined that the identified device controller is incompatible with the identified device, the control signal from the device controller into a control signal recognizable by the device, and control the converted control signal to be provided to the device.

20 Claims, 17 Drawing Sheets

(56) References Cited

U.S. PATENT DOCUMENTS

| | | | |
|---|---|---|---|
| 9,942,605 B2 | 4/2018 | Lee et al. | |
| 10,614,704 B2* | 4/2020 | Arling | G08C 17/02 |
| 2005/0176504 A1* | 8/2005 | Stanley | A63F 13/22 |
| | | | 463/37 |
| 2005/0176505 A1* | 8/2005 | Stanley | A63F 13/42 |
| | | | 463/37 |
| 2012/0084452 A1* | 4/2012 | Pettit | G08C 17/02 |
| | | | 709/230 |
| 2013/0154791 A1* | 6/2013 | Srivastava | G08C 23/04 |
| | | | 340/1.1 |
| 2013/0281211 A1 | 10/2013 | Yasuda et al. | |
| 2016/0241905 A1 | 8/2016 | Gao et al. | |
| 2020/0304445 A1 | 9/2020 | Dinhthi et al. | |

FOREIGN PATENT DOCUMENTS

| | | |
|---|---|---|
| KR | 10-2012-0128373 A | 11/2012 |
| KR | 10-2015-0048660 A | 5/2015 |
| KR | 10-2016-0132900 | 11/2016 |
| KR | 10-2018-0011509 A | 2/2018 |
| KR | 10-2019-0095661 A | 8/2019 |
| KR | 10-2166659 B1 | 10/2020 |
| KR | 10-2522150 B1 | 4/2023 |

\* cited by examiner

DISPLAY APPARATUS AND OPERATING METHOD THEREOF

CROSS-REFERENCE TO RELATED APPLICATIONS

This application is a continuation of International Application No. PCT/KR2022/008309 designating the United States, filed on Jun. 13, 2022, in the Korean Intellectual Property Receiving Office and claiming priority to Korean Parent Application No. 10-2021-0106942, filed on Aug. 12, 2021, in the Korean Intellectual Property Office, the disclosures of which are incorporated by reference herein in their entireties.

BACKGROUND

Field

The disclosure relates to a display apparatus and/or an operating method thereof, and for example, to a display apparatus capable of conveniently connecting a device to a device controller, which are connected to the display apparatus, and an operating method thereof.

Description of Related Art

Recently, the number of gamers has increased, and also the demand to play a game on a large-screen television (TV) for better game immersion has increased.

However, currently, playing a game on a TV implies that a game console is controlled only by using a game controller dedicated for that game console, and the TV merely receives and displays game play images according to control through that game controller. Consequently, despite the variety of game consoles connectable to TVs and the variety of game controllers, users still have to prepare game consoles and respective game controllers corresponding thereto and directly control the game consoles by using the game controllers individually.

In accordance with the increasing demand for games and gamers' convenience, there is a need for a method, performed by a TV, of controlling a game console and a game controller in a more active manner.

SUMMARY

Embodiments of the disclosure provide a display apparatus capable of conveniently connecting a device to a device controller, which are connected to the display apparatus, and/or an operating method thereof.

According to an example embodiment of the disclosure, a display apparatus includes: a display; a memory storing one or more instructions; and at least one processor configured to execute the one or more instructions stored in the memory to identify a device controller activated on the display apparatus and a device activated on the display apparatus (each of the device controller and the device comprising circuitry), determine whether the identified device controller is compatible with the identified device, based on determining that the identified device controller is compatible with the identified device, control a control signal from the device controller to be directly provided to the device, and based on determining that the identified device controller is incompatible with the identified device, convert the control signal from the device controller into a control signal recognizable by the device, and control the converted control signal to be provided to the device.

According to an example embodiment of the disclosure, the processor may execute the one or more instructions to, based on detecting a predefined event, identify the device controller activated on the display apparatus and the device activated on the display apparatus, and the predefined event may include at least one of detection of activation of the device controller, recognition of the device controller, detection of a change in selection of the device, recognition of the device, or detection of activation of a hub graphical user interface.

According to an example embodiment of the disclosure, the processor may execute the one or more instructions to perform a connection operation with the activated device controller, and identify the device controller by obtaining identification information of the device controller received through the connection operation.

According to an example embodiment of the disclosure, the processor may execute the one or more instructions to identify the activated device by obtaining identification information of the activated device received through an operation of recognizing the device.

According to an example embodiment of the disclosure, the processor may execute the one or more instructions to determine whether the identified device controller is compatible with the identified device, based on identification information of the device controller and identification information of the device.

According to an example embodiment of the disclosure, the processor may execute the one or more instructions to determine whether the identified device controller is compatible with the identified device, based on identification information and version information of the device controller, and identification information and version information of the device.

According to an example embodiment of the disclosure, the memory may be configured to store one or more conversion tables for converting a control signal from the device controller into a code recognizable by one or more devices that are incompatible with the device controller. The conversion table(s) may, or may not, be considered as part of the one or more instructions.

According to an example embodiment of the disclosure, the processor may execute the one or more instructions to, based on determining that the identified device controller is incompatible with the identified device, convert a control signal from the device controller into a code recognizable by the device, based on a conversion table corresponding to the device controller and the device among the one or more conversion tables.

According to an example embodiment of the disclosure, the processor may execute the one or more instructions to, based on detecting a predefined event, identify the device controller activated on the display apparatus and the device activated on the display apparatus, and store control signal conversion configuration information including identification information of the activated device controller, identification information of the activated device, and a control signal conversion table for converting a control signal from the activated device controller into a code recognizable by the activated device.

According to an example embodiment of the disclosure, the processor may execute the one or more instructions to receive a control signal from the activated device controller, convert the control signal into a code recognizable by the activated device, based on the stored control signal conversion configuration information corresponding to the activated device controller, and provide the code to the device.

According to an example embodiment of the disclosure, an operating method of a display apparatus includes: identifying a device controller activated on the display apparatus and a device activated on the display apparatus; determining whether the identified device controller is compatible with the identified device; based on determining that the identified device controller is compatible with the identified device, controlling a control signal from the device controller to be directly provided to the device; and based on determining that the identified device controller is incompatible with the identified device, converting the control signal from the device controller into a control signal recognizable by the device, and controlling the converted control signal to be provided to the device.

According to an example embodiment of the disclosure, in a computer-readable recording medium having recorded thereon one or more programs to be executed by a processor of a display apparatus for implementing an operating method of the display apparatus, the operating method includes: identifying a device controller activated on the display apparatus and a device activated on the display apparatus; determining whether the identified device controller is compatible with the identified device; based on determining that the identified device controller is compatible with the identified device, controlling a control signal from the device controller to be directly provided to the device; and based on determining that the identified device controller is incompatible with the identified device, converting the control signal from the device controller into a control signal recognizable by the device, and controlling the converted control signal to be provided to the device.

According to various example embodiments of the disclosure, user convenience may be increased by connecting a device to a device controller, which are connected to a display apparatus, and controlling them in a more convenient manner.

According to various example embodiments of the disclosure, a user may access various devices and servers using one device controller.

According to various example embodiments of the disclosure, the usability of a display apparatus may be increased by inducing users to use a game hub provided by the display apparatus more frequently and for a longer period of time.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
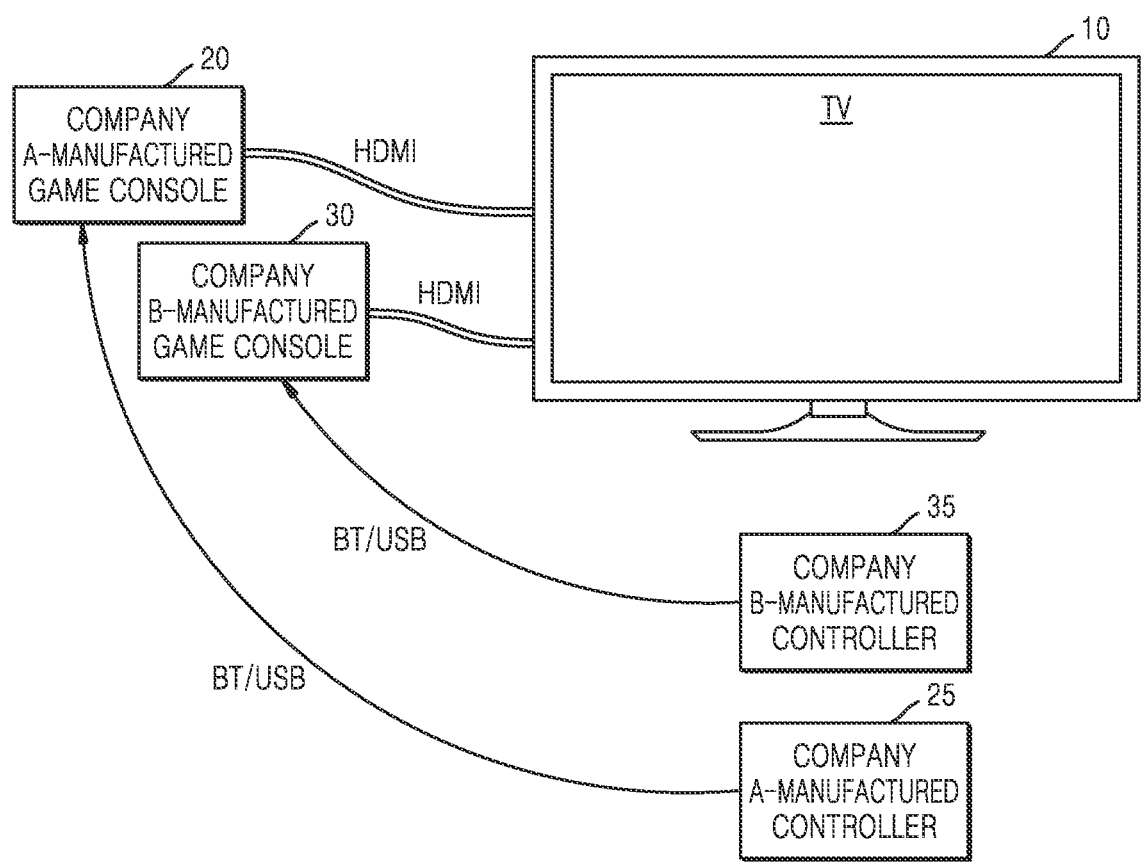
FIG. 1 is a diagram illustrating an example of using game content using a television (TV), according to the related art.

Throughout the disclosure, the expression "at least one of a, b or c" indicates only a, only b, only c, both a and b, both a and c, both b and c, all of a, b, and c, or variations thereof.

The terms used herein will be briefly described, and then the disclosure will be described in detail.

Although the terms used in the disclosure are selected from among common terms that are currently widely used in consideration of their functions in the disclosure, the terms may be different according to an intention of one of ordinary skill in the art, a precedent, or the advent of new technology. Also, in particular cases, the terms are discretionally selected by the applicant of the disclosure, in which case, the meaning of those terms will be described in detail in the corresponding part of the detailed description. Therefore, the terms used herein are not merely designations of the terms, but the terms are defined based on the meaning of the terms and content throughout the disclosure.

Throughout the specification, when a part "includes" a component, it means that the part may additionally include other components rather than excluding other components as long as there is no particular opposing recitation. Also, the terms described in the specification, such as " . . . er (or)", " . . . unit", " . . . module", etc., denote a unit that performs at least one function or operation, which may be implemented as hardware (e.g., circuitry) or software or a combination thereof.

Hereinafter, embodiments of the disclosure will be described in detail with reference to the accompanying drawings for one of skill in the art to be able to perform the disclosure without any difficulty. The disclosure may, however, be embodied in many different forms and should not be construed as being limited to the embodiments of the disclosure set forth herein. In order to clearly describe the disclosure, portions that are not relevant to the description of the disclosure are omitted, and similar reference numerals are assigned to similar elements throughout the specification.

In embodiments of the disclosure described herein, the term "user" refers to a person who (in the present, or in the future is to) controls functions or operations of a computing device or an electronic device by using a control device, and may include a current or future viewer, an administrator, or an installer.

FIG. 1 is a diagram illustrating an example of using game content by using a television (TV) 10, according to the related art.

Referring to FIG. 1, a plurality of game consoles from different manufacturers may be connected to the TV 10. For example, a company A-manufactured game console 20 and a company B-manufactured game console 30 may be connected to the TV 10 through an interface such as High-Definition Multimedia Interface (HDMI). In order to play the game content on a large-screen TV, a user may connect the company A-manufactured game console 20 to the TV 10 to display a game image received from the company A-manufactured game console 20 by using the TV 10, and may connect the company B-manufactured game console 30 to display a game image received from the company B-manufactured game console 30 by using the TV 10. Because each game console manufacturer sells a controller to be used with its own manufactured game console, the user has to use a company A-manufactured controller 25 to play the game content by using the company A-manufactured game console 20. Also, the user has to use a company B-manufactured controller 35 to play the game content by using the company B-manufactured game console 30. Each game console and the corresponding game controller from the same manufacturer may be connected to each other through, e.g., Bluetooth (BT) or universal serial bus (USB) communication. In general, game controllers from different manufacturers are incompatible with each other, the user may control a game console by using a game controller from the same manufacturer as that of the game console. Accordingly, the user is unable to control the company B-manufactured game console 30 by using the company A-manufactured controller 25, and to control the company A-manufactured game console 20 by using the company B-manufactured controller 35. Therefore, the user may play the game content by using the large screen of the TV 10, but still has to prepare a pair of a company A-manufactured game console and a company A-manufactured controller, or a pair of a company B-manufactured game console and a company B-manufactured controller. Thus, the advantages of using a TV is inevitably reduced.

In addition, although a game image from the company A-manufactured game console 20 is received and displayed by the TV 10, the TV 10 merely receives and displays only the game image generated by the company A-manufactured game console 20, control of the game image is performed through the company A-manufactured controller 25, a control signal from the company A-manufactured controller 25 is directly transmitted to the company A-manufactured game console 20, and then a computation or operation corresponding to the control signal is performed by the company A-manufactured game console 20. Thus, the TV 10 serves only as a monitor or a display to receive and display a controlled or played game image from a game console from each manufacturer, and has only a limited role in actively reproducing a game image of the user.

Therefore, in order to provide the user with experience of controlling game content through a larger screen, it may be preferable that the TV plays a more active role for the user, beyond a passive role of simply receiving and displaying a game image from a game console. To this end, it may be preferable that the TV 10 more organically manages each manufacturer's game console and controller. Therefore, embodiments of the disclosure propose a method of connecting a controller from a certain manufacturer to the TV 10, actively converting a control signal received from the connected controller into a code recognizable by a game console from another manufacturer or by a certain source, and transmitting the code to the game console or the source.

Figure 2:
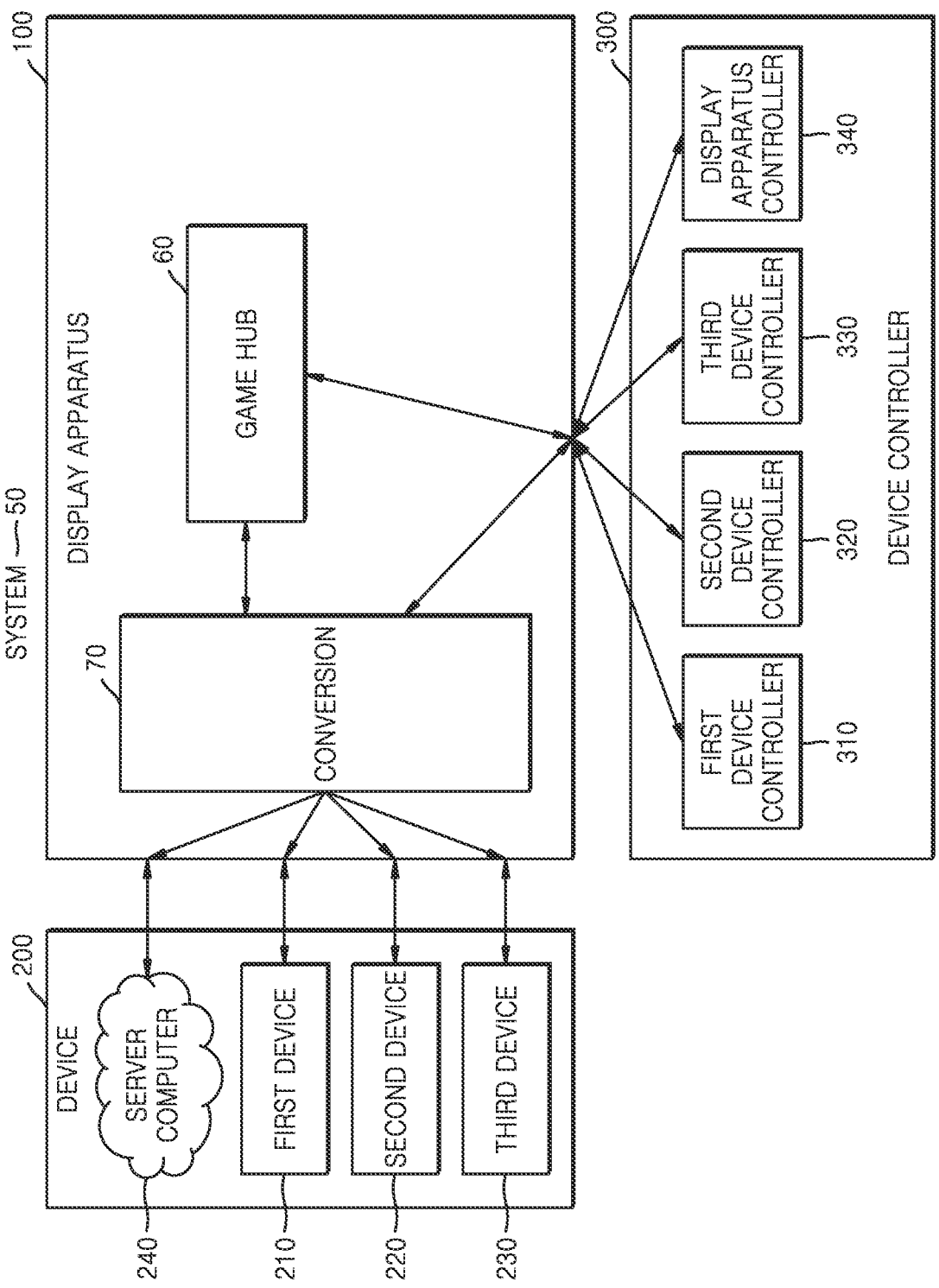
FIG. 2 is a block diagram illustrating an example configuration of a system including a display apparatus, a device, and a device controller, according to various embodiments.

FIG. 2 illustrates an example of a system 50 including a display apparatus 100, a device 200 (hereinafter, also referred to as the source device 200), and a device controller 300, according to an embodiment of the disclosure. Each controller herein includes circuitry.

Referring to FIG. 2, the system 50 may include the display apparatus 100, the device 200, and the device controller 300.

The device 200 may be an electronic device that is connected to the display apparatus 100 in a wired or wireless manner to transmit and receive data and/or content, and may transmit game content to, e.g., the display apparatus 100. The device 200 may also transmit image content and/or audio content, in addition to game content.

The device 200 may be any device capable of connecting to the display apparatus 100 to transmit and receive data, and may include, for example, a first device 210, a second device 220, a third device 230, and a server computer 240.

The first device 210, the second device 220, and the third device 230 may be positioned around the display apparatus 100 and connected to the display apparatus 100 in a wired manner through a HDMI interface or the like, or in a wireless manner through Wi-Fi communication or BT communication, which is a short-range communication technology. The first device 210, the second device 220, and the third device 230 may include, for example, an external input device connected to the display apparatus 100 through a cable or the like to provide an image through wired communication. The external input device may include various types of electronic devices, for example, a set-top box, a digital versatile disc (DVD) player, a Blu-ray disc player, a personal computer (PC), a game console, and the like, which are capable of providing content to the display apparatus 100. The external input device and the display apparatus 100 may be connected to each other through various connection units to perform content transmission and reception. The connection units may include, for example, a cable, and the external input device and the display apparatus 100 may include one or more ports for cable connection. The one or more ports may include, for example, a digital input interface such as a HDMI port, a display port, a type-C port, etc. For example, each of the first device 210 and the display apparatus 100 may include an HDMI port to perform communication therethrough.

For example, the first device 210, the second device 220, and the third device 230 may be devices dedicated to game content, for example, game consoles. However, the first device 210, the second device 220, and the third device 230 are not limited to game consoles, and may be any type of device that provides various types of content, for example, game content, movie content, and video content.

The first device 210, which is manufactured by a first manufacturer, is able to directly communicate with a first device controller 310 manufactured by the first manufacturer, but is unable to directly communicate with a second device controller 320, a third device controller 330, or a display apparatus controller 340 (hereinafter, also referred to as the remote controller 340). That is, because the first device 210 is unable to interpret a control signal received from the second device controller 320 or the third device controller 330, which is manufactured by another manufacturer, it is difficult for the first device 210 to directly communicate with the second device controller 320 or the third device controller 330. Furthermore, when there are a plurality of versions of devices and a plurality of versions of controllers for the devices, which are all from the same manufacturer, even a device and a controller from the same manufacturer may not be compatible with each other in some cases. In this case, direct communication may be impossible between the incompatible device and device controller. Each device (e.g., 200, 210, 220, 230) herein, and each controller herein (e.g., 150, 310, 320, 330, 340), includes circuitry and may optionally include a display.

The second device 220, which is manufactured by a second manufacturer, is able to directly communicate with the second device controller 320 manufactured by the second manufacturer, but is unable to directly communicate with the first device controller 310, the third device controller 330, or the display apparatus controller 340.

The third device 230, which is manufactured by a third manufacturer, is able to directly communicate with the third device controller 330 manufactured by the third manufacturer, but is unable to directly communicate with the first device controller 310, the second device controller 320, or the display apparatus controller 340.

The server computer 240 is a device connected to the display apparatus 100 through the Internet, and is unable to directly communicate with the first device controller 310, the second device controller 320, the third device controller 330, and the display apparatus controller 340.

The device controller 300 may be any device capable of connecting to the display apparatus 100 to transmit and receive a control signal, and may include, for example, the first device controller 310, the second device controller 320, the third device controller 330, and the display apparatus controller 340.

The first device controller 310, the second device controller 320, the third device controller 330, and the display apparatus controller 340 may be connected to the display apparatus 100 through various types of wireless communication. The types of wireless communication may include, for example, Wi-Fi communication, BT communication, and infrared communication.

The first device controller 310, which is manufactured by the first manufacturer, is able to directly communicate with the first device 210, but is unable to directly communicate with the second device 220, the third device 230, and the server computer 240.

The second device controller 320, which is manufactured by the second manufacturer, is able to directly communicate with the second device 220, but is unable to directly communicate with the first device 210, the third device 230, and the server computer 240.

The third device controller 330, which is manufactured by the third manufacturer, is able to directly communicate with the third device 230, but is unable to directly communicate with the first device 210, the second device 220, and the server computer 240.

The display apparatus controller 340 is a device for remotely controlling the display apparatus 100, and is able to directly communicate with the display apparatus 100 but is unable to directly communicate with the first device 210, the second device 220, the third device 230, and the server computer 240.

The display apparatus 100 may include a display to display image content, video content, game content, graphic content, and the like. The display apparatus 100 may output or display an image or content received from the device 200. The display apparatus 100 may include various types of electronic devices capable of receiving and outputting content, such as a network TV, a smart TV, an Internet TV, a web TV, an internet protocol TV (IPTV), a PC, and the like. The display apparatus 100 may be referred to as a display apparatus in that it receives and displays content, and may also be referred to as a content receiving device, a sink device, an electronic device, a computing device, and the like.

The display apparatus 100 may receive a control signal from the display apparatus controller 340 that remotely controls the display apparatus 100, and perform an operation corresponding to the received control signal. For example, the display apparatus 100 may receive, from the display apparatus controller 340, a control signal for channel control, volume control, and control of movement of items or menus included in a graphical user interface displayed on the display of the display apparatus 100, and perform an operation corresponding to the received control signal.

The display apparatus 100 may be first connected to the device controller 300 through wireless communication in order to receive a control signal from the device controller 300. The wireless communication may include, for example, BT communication, Wi-Fi communication, and infrared communication.

According to an embodiment of the disclosure, the display apparatus 100 may provide a game hub 60 for providing users with a more convenient game play environment. The game hub 60 may be a platform for providing users with a more convenient game play environment by using the display apparatus 100. In addition, such a platform, e.g., the game hub 60, may include one or more applications, data, and one or more graphical user interfaces for providing the user with a game play environment.

According to an embodiment of the disclosure, the game hub 60 may include a graphical user interface to allow the user to select a source that provides game content to play. For example, the game hub 60 may include a graphical user interface that allows the user to select one of devices included in the device 200, e.g., the server computer 240, the first device 210, the second device 220, and the third device 230, as a game content providing source. The game hub 60 may also include a graphical user interface for controlling or selecting an environment of the display apparatus 100 to play game content.

According to an embodiment of the disclosure, the display apparatus 100 may provide a conversion function 70. The conversion function 70 may be a function of identifying an activated device and an activated device controller, converting a control signal from the activated device controller into a code recognizable by the activated device, and providing the code to the activated device. The activated device may be a device that is connected to the display apparatus 100 to transmit and receive data to and from the display apparatus 100. The activated device controller may be a device that is connected to the display apparatus 100 to transmit and receive data to and from the display apparatus 100.

According to an embodiment of the disclosure, when the activated device and the activated device controller are able to directly communicate with each other, the display apparatus 100 may perform configuration such that a control signal from the activated device controller is directly transmitted to the activated device controller. In detail, that the device and the device controller are able to directly communicate with each other may indicate that the device and the device controller are compatible with each other in terms of manufacturer and/or version. For example, the states where the device and the device controller are compatible with each other may include a case where the device and the device controller are from the same manufacturer, or a case where the device and the device controller are from the same manufacturer and have the same version information.

For example, when the activated device is the first device 210 and the activated device controller is the first device controller 310, they are able to directly communicate with each other, and thus, the display apparatus 100 may perform configuration such that a control signal from the activated first device controller 310 is directly transmitted to the activated first device 210. For example, when the activated device is the second device 220 and the activated device controller is the second device controller 320, they are able to directly communicate with each other, and thus, the display apparatus 100 may perform configuration such that a control signal from the activated second device controller 320 is directly transmitted to the activated second device 220. For example, when the activated device is the third device 230 and the activated device controller is the third device controller 330, they are able to directly communicate with each other, and thus, the display apparatus 100 may perform configuration such that a control signal from the activated third device controller 330 is directly transmitted to the activated third device 230. For example, when the activated device is the display apparatus 100 and the activated device controller is the display apparatus controller 340, they are able to directly communicate with each other, and thus, the display apparatus 100 may perform configuration such that a control signal from the activated display apparatus controller 340 is directly transmitted to the display apparatus 100. For example, when the destination of a control signal to be transmitted is the game hub 60, the game hub 60 may be directly controlled by the display apparatus controller 340 because the game hub 60 is an entity included in the display apparatus 100.

According to an embodiment of the disclosure, when the activated device and the activated device controller are unable to directly communicate with each other, the display apparatus 100 may perform configuration such that a control signal from the activated device controller is converted into a code recognizable by the activated device by using the conversion function 70. In detail, that the device and the device controller are unable to directly communicate with each other may indicate that the device and the device controller are incompatible with each other in terms of manufacturer and/or version. For example, the states where the device and the device controller are incompatible with each other may include a case where the device and the device controller are from different manufacturers, or a case where the device and the device controller are from the same manufacturer but have different version information.

For example, when the activated device controller is the first device controller 310 and the activated device is a device other than the first device 210, for example, the second device 220, they are unable to directly communicate with each other, and thus, the display apparatus 100 may perform configuration such that a control signal from the activated first device controller 310 is converted into a code recognizable by the activated second device 220 and then provided to the activated second device 220. For example, when the activated device controller is the second device controller 320 and the activated device is a device other than the second device 220, for example, the first device 210, they are unable to directly communicate with each other, and thus, the display apparatus 100 may perform configuration such that a control signal from the activated second device controller 320 is converted into a code recognizable by the activated first device 210 and then provided to the activated first device 210. For example, when the activated device controller is the third device controller 330 and the activated device is a device other than the third device 230, for example, the second device 220, they are unable to directly communicate with each other, and thus, the display apparatus 100 may perform configuration such that a control signal from the activated third device controller 330 is converted into a code recognizable by the activated second device 220 and then provided to the activated second device 220. For example, when the activated device controller is the display apparatus controller 340 and the activated device is the server computer 240, they are unable to directly communicate with each other, and thus, the display apparatus 100 may perform configuration such that a control signal from the activated display apparatus controller 340 is converted into a code recognizable by the activated server computer 240 and then provided to the activated server computer 240.

Figure 3:
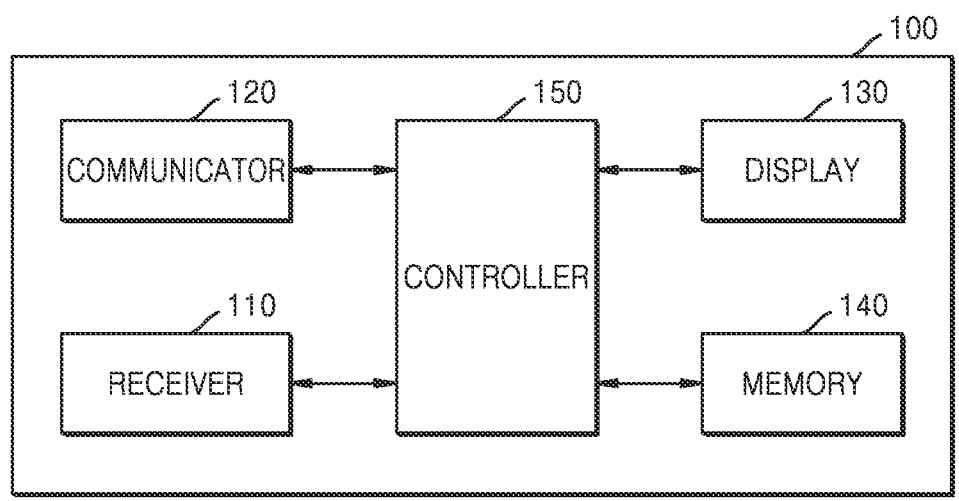
FIG. 3 is a block diagram illustrating an example configuration of a display apparatus according to various embodiments.

FIG. 3 is a block diagram of the display apparatus 100 according to an embodiment of the disclosure.

Referring to FIG. 3, the display apparatus 100 may process and output an image signal and/or an audio signal received from the device 200.

The display apparatus 100 may include a receiver 110, a communicator 120, a display 130, a memory 140, and a controller 150.

The receiver 110 may receive an image signal and/or an audio signal from the device 200 according to a protocol used for connection therebetween, under the control by the controller 150.

The communicator 120 may receive an image signal and/or an audio signal from the device 200 according to a wireless communication protocol under the control by the controller 150.

The display 130 may display an image signal received from the source device 200 on a screen.

The memory 140 may store programs related to an operation of the display apparatus 100 and various pieces of data generated during an operation of the display apparatus 100.

The controller 150 may control the overall operation of the display apparatus 100, and may control the display apparatus 100 to process an image signal transmitted from the source device 200 and display the processed image signal on the display 130.

According to an embodiment of the disclosure, the controller 150 may execute one or more instructions to identify a device controller activated on the display apparatus and a device activated on the display apparatus, determine whether the identified device controller is compatible with the identified device, control, when it is determined that the identified device controller is compatible with the identified device, a control signal from the device controller to be directly provided to the device, and control, when it is determined that the identified device controller is incompatible with the identified device, a control signal from the device controller to be converted into a control signal recognizable by the device and provide the converted control signal to the device.

According to an embodiment of the disclosure, the controller 150 may execute the one or more instructions to identify the device controller activated on the display apparatus and the device activated on the display apparatus when a predefined event is detected, and the predefined event may include at least one of detection of activation of the device controller, recognition of the device controller, detection of a change in selection of the device, recognition of the device, or detection of activation of a hub graphical user interface.

According to an embodiment of the disclosure, the controller 150 may execute the one or more instructions to perform a connection operation with the activated device controller, obtain identification information of the device controller received through the connection operation, and identify the device controller based on the identification information.

According to an embodiment of the disclosure, the controller 150 may execute the one or more instructions to obtain identification information of the activated device received through an operation of recognizing the device, and identify the activated device based on the identification information.

According to an embodiment of the disclosure, the controller 150 may execute the one or more instructions to determine whether the identified device controller is compatible with the identified device based on at least one of identification information or version information of the device controller and at least one of identification information or version information of the device.

According to an embodiment of the disclosure, the memory may store one or more conversion tables for converting a control signal from the device controller into a code recognizable by one or more devices that are incompatible with the device controller.

According to an embodiment of the disclosure, the controller 150 may execute the one or more instructions to, when it is determined that the identified device controller is incompatible with the identified device, convert a control signal from the device controller into a code recognizable by the device, based on the conversion table corresponding to the device controller and the device.

According to an embodiment of the disclosure, the controller 150 may execute the one or more instructions to, when a predefined event is detected, identify the device controller activated on the display apparatus and the device activated on the display apparatus, and store control signal conversion configuration information including identification information of the activated device controller, identification information of the activated device, and a control signal conversion table for converting a control signal from the activated device controller into a code recognizable by the activated device.

According to an embodiment of the disclosure, the controller 150 may execute the one or more instructions to receive a control signal from the activated device controller, convert the control signal into a code recognizable by the activated device, based on the stored control signal conversion configuration information corresponding to the activated device controller, and provide the code to the device.

Figure 4:
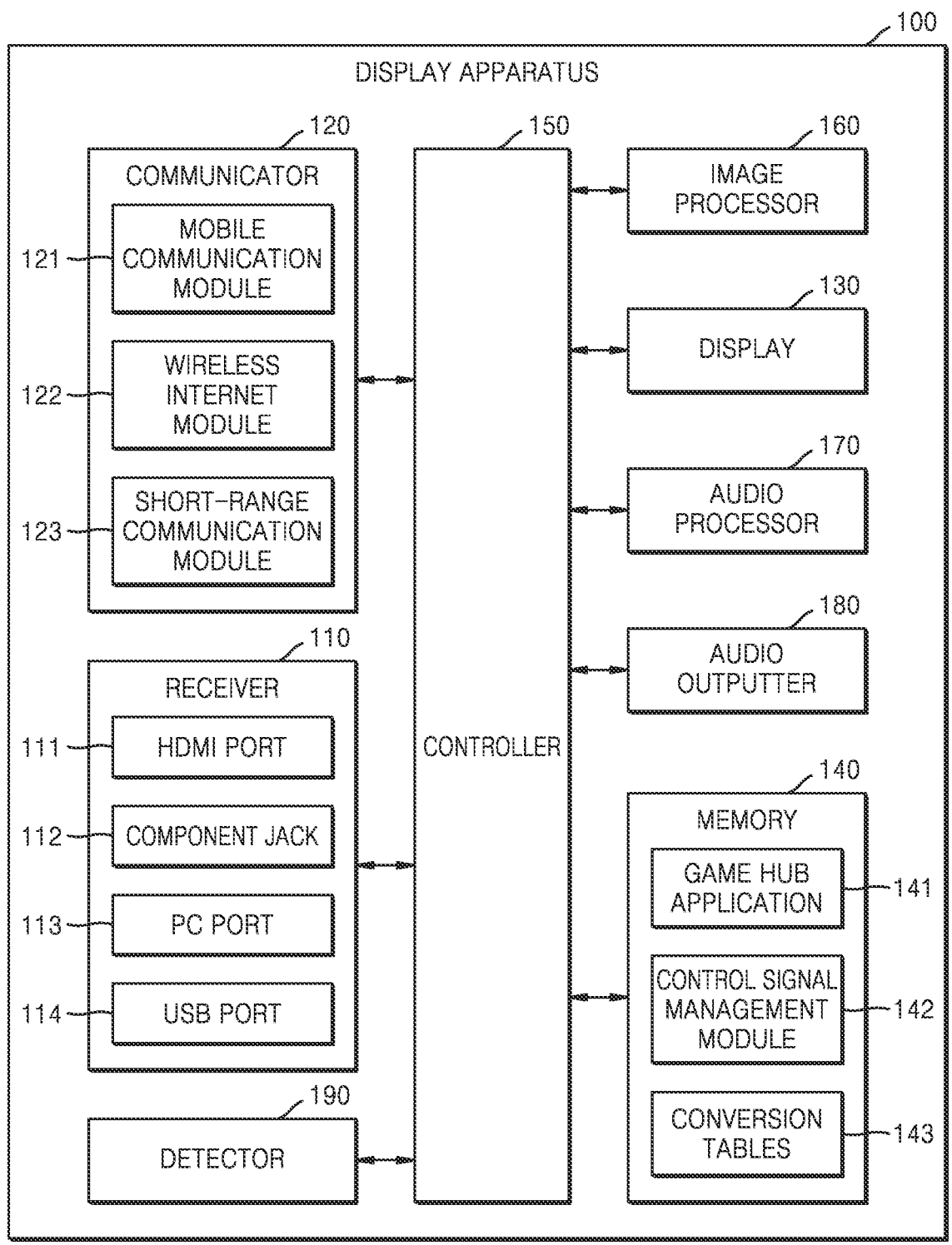
FIG. 4 is a block diagram illustrating an example configuration of a display apparatus according to various embodiments.

FIG. 4 is a block diagram of the display apparatus 100 according to an embodiment of the disclosure.

Referring to FIG. 4, the display apparatus 100 may further include an image processor 160, an audio processor 170, an audio outputter 180, and a detector 190, in addition to the receiver 110, the communicator 120, the display 130, the memory 140, and the controller 150. Each processor herein may include processing circuitry.

The receiver 110 may receive an image signal and an audio signal received from an external input device according to a protocol used for connection therebetween, and output the received image signal and audio signal to the image processor 160 and the audio processor 170, under the control by the controller 150.

The receiver 110 may receive a video (e.g., a moving image, etc.), an audio (e.g., a voice, a music, etc.), and additional information (e.g., an electronic programming guide (EPG), etc.) from the outside of the display apparatus 100 under the control by the controller 150. The receiver 110 may include one of an HDMI port 111, a component jack 112, a PC port 113, and a USB port 114, or a combination thereof. In addition to the HDMI port, the receiver 110 may further include a DisplayPort (DP), a Thunderbolt port, and a Mobile High-Definition Link (MHL) port.

The communicator 120 may include one or more modules (e.g., including circuitry) that enable wireless communication between the display apparatus 100 and a wireless communication system or between the display apparatus 100 and a network in which another electronic device is located. For example, the communicator 120 may include a mobile communication module 121, a wireless Internet module 122, and a short-range communication module 123, each of which may include circuitry.

The mobile communication module 121 transmits and receives a wireless signal to and from at least one of a base station, an external terminal, or a server, on a mobile communication network. The wireless signal may include various types of data according to transmission and reception of voice call signals, video call signals, or text/multimedia messages.

The wireless Internet module 122 refers to a module for wireless Internet access, and may be embedded in or external to a device. Examples of the wireless Internet technology may include wireless local area network (WLAN) (e.g., Wi-Fi), wireless broadband (Wibro), worldwide interoperability for microwave access (Wimax), and high-speed downlink packet access (HSDPA). Through the wireless Internet module 122, the device may establish a Wi-Fi Peer-to-Peer (P2P) connection with another device.

The short-range communication module 123 refers to a module for short-range communication. BT, radio frequency identification (RFID), Infrared Data Association (IrDA), ultra wideband (UWB), ZigBee, or the like may be used as the short-range communication technology.

The image processor 160 may process an image signal received from the receiver 110 or the communicator 120 and output the processed image signal to the display 130 under the control by the controller 150.

The display 130 may display an image signal received from the image processor 160 on a screen.

The audio processor 170 may convert an audio signal received from the receiver 110 or the communicator 120 into an analog audio signal and output the analog audio signal to the audio outputter 180, under the control by the controller 150.

The audio outputter 180 may output the received analog audio signal through a speaker.

The memory 140 may store programs related to an operation of the display apparatus 100 and various pieces of data generated during an operation of the display apparatus 100.

According to an embodiment of the disclosure, the memory 140 may include a game hub application 141, a control signal management module 142 including circuitry, and conversion tables 143.

The game hub application 141 may include one or more instructions that enable a function, an operation, and a graphical user interface of the game hub 60 according to an embodiment of the disclosure.

The control signal management module 142 may include one or more instructions for managing, when a control signal is received from the device controller 300, transmission of the control signal received from the device controller 300 to a target device based on the conversion tables 143.

The conversion tables 143 may include one or more data structures for converting, when an activated device and an activated device controller are unable to directly communicate with each other, a control signal from the activated device controller into a code recognizable by the activated device. In detail, the conversion tables 143 may include a mapping table for converting a control signal from each of a plurality of device controllers into a code recognizable by each of a plurality of devices. For example, in the system 50 as illustrated in FIG. 2, a control signal from the first device controller 310 may be directly transmitted to the first device 210, and thus, a conversion table for connecting the first device controller 310 to the first device 210 may be unnecessary. The conversion table 143 may include a conversion table for connecting the first device controller 310 to the second device 220, a conversion table for connecting the first device controller 310 to the third device 230, a conversion table for connecting the first device controller 310 to the server computer 240, and a conversion table for connecting the first device controller 310 to the display apparatus 100.

Figure 5:
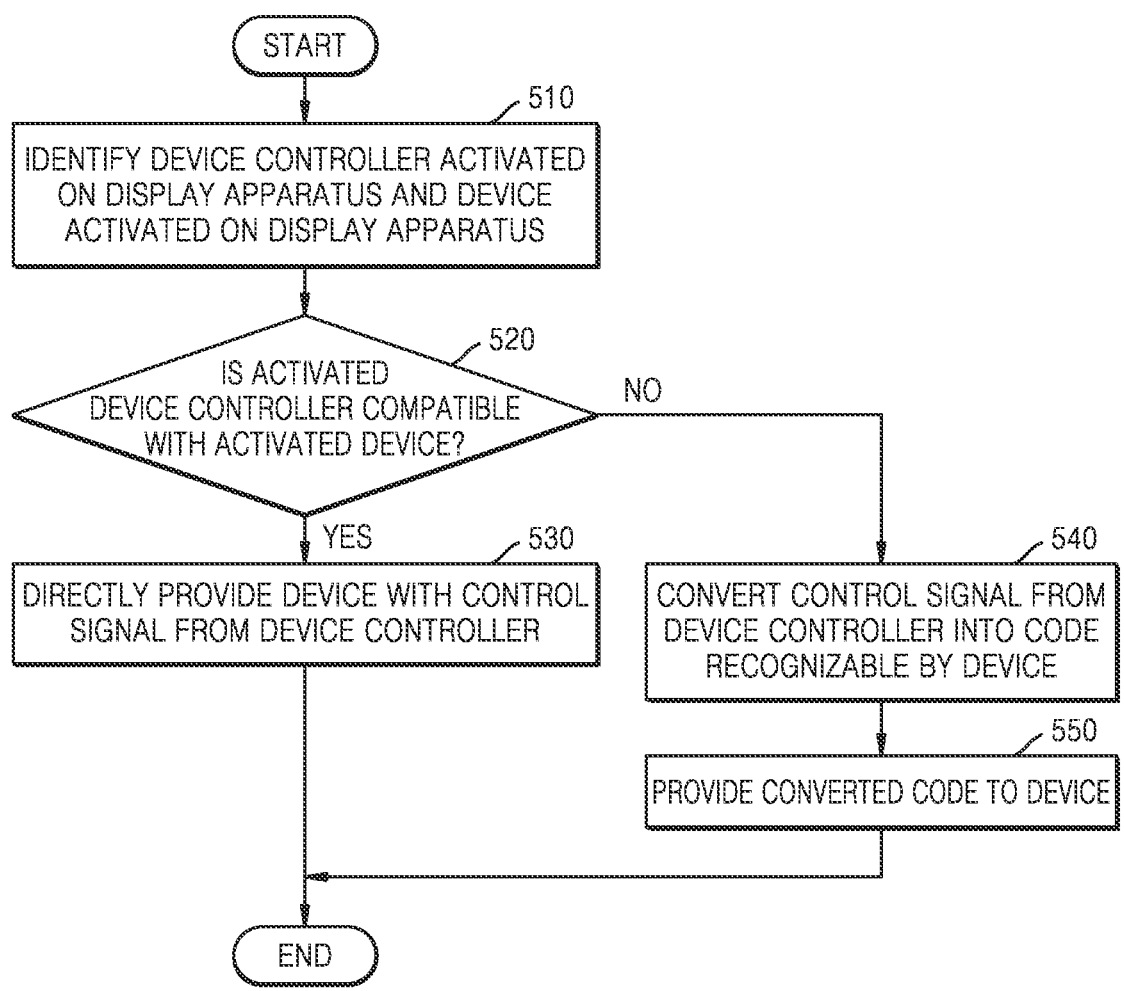
FIG. 5 is a flowchart illustrating an example method of operating a display apparatus, according to various embodiments.

FIG. 5 is a flowchart of an example of an operating method of a display apparatus, according to an embodiment of the disclosure.

Referring to FIG. 5, in operation 510, a device controller activated on the display apparatus and a device activated on the display apparatus may be identified. The device controller activated on the display apparatus may be a device controller connected to and thus able to communicate with the display apparatus. The device activated on the display apparatus may be a device connected to and thus able to communicate with the display apparatus.

According to an embodiment of the disclosure, the display apparatus may perform a connection operation with the activated device controller, obtain identification information of the device controller received through the connection operation, and identify the device controller based on the identification information. For example, the display apparatus 100 may receive, from the device controller, the identification information of the device controller for identifying the device controller in an initial stage of BT communication or USB communication connection with the device controller. For example, the display apparatus 100 may receive, from a remote controller, identification information of the remote controller for identifying the remote controller in an initial stage of infrared communication or BT communication connection with the remote controller.

According to an embodiment of the disclosure, the display apparatus may obtain identification information of the device received through an operation of recognizing the device, and identify the activated device based on the identification information. For example, the display apparatus 100 may receive the identification information of the device for identifying the device when connecting to the device through HDMI communication or USB communication.

According to an embodiment of the disclosure, when a predefined event is detected, the display apparatus 100 may identify the device controller activated on the display apparatus and the device activated on the display apparatus, as illustrated in FIG. 2.

According to an embodiment of the disclosure, the predefined event may include at least one of detection of activation of the device controller, detection of activation of the device, detection of a change in selection of a source device, or detection of activation of a game hub. The detection of activation of the device controller may indicate that the display apparatus and the device controller are detected to be communicatively connected to each other. The detection of activation of the device may indicate that the display apparatus and the device are detected to be communicatively connected to each other. The detection of a change in selection of a source device may indicate that the display apparatus detects that the source device has been changed by a user or the like. The detection of activation of a game hub may indicate that the game hub is detected to be activated by a particular user input. For example, the game hub may be activated by a particular button input on the device controller connected to the display apparatus, and the activation of the game hub may be detected by receiving a control signal corresponding to the particular button input. Alternatively, as a command for activating the game hub is received via a menu selection through a graphical user interface provided in the display apparatus or a voice command, the activation of the game hub may be detected.

In operation 520, the display apparatus 100 may determine whether the identified device controller is compatible with the identified device.

According to an embodiment of the disclosure, the display apparatus 100 may determine whether the identified device controller is compatible with the identified device, based on at least one of manufacturer information or version information of the device controller, and at least one of manufacturer information or version information of the device. That the device controller and the device are compatible with each other indicates that the device may directly receive a control signal from the device controller and perform an operation corresponding to the received control signal.

According to an embodiment of the disclosure, when the device controller and the device are from the same manufacturer, the display apparatus 100 may determine that the device controller and the device are compatible with each other.

According to an embodiment of the disclosure, the display apparatus 100 may further consider the version information in addition to the manufacturer information, and determine that the device controller and the device are compatible with each other when they have the same manufacturer information and version information. For example, even a device controller and a device, which are from the same manufacturer, may be incompatible with each other when they are of different versions. For example, even a device controller and a device, which are from the same manufacturer, may be incompatible with each other when the version of the device is 1.0 and the version of the device controller is 2.0. Accordingly, when there are a plurality of incompatible versions of the device and the device controller, which are from the same manufacturer, the display apparatus may determine the compatibility therebetween by further considering the version information in addition to the manufacturer information.

When it is determined, in operation 520, that the identified device controller is compatible with the identified device, the method may proceed to operation 530.

As it is determined that the identified device controller is compatible with the identified device, in operation 530, the display apparatus 100 may control a control signal from the device controller to be directly provided to the device. That the identified device controller is compatible with the identified device indicates that the device is able to directly receive a control signal of the device controller. Accordingly, in this case, the display apparatus 100 may perform configuration such that a control signal received from the device controller is directly transmitted to the device.

When it is determined, in operation 520, that the identified device controller is incompatible with the identified device, the method may proceed to operation 540.

As it is determined that the identified device controller is incompatible with the identified device, the display apparatus 100 may convert, in operation 540, a control signal from the device controller into a code recognizable by the device, and control, in operation 550, the converted code to be provided to the device. Because the identified device controller is incompatible with the identified device, the identified device is unable to parse a control signal of the device controller. Therefore, it is necessary to convert a control signal from the device controller into a code interpretable or parsable by the device and then provide the code to the device, in order to allow the device to perform an operation corresponding to the control signal. The display apparatus 100 according to the embodiment may serve to convert a control signal from the device controller into a code interpretable by the device and provide the code to the device.

According to an embodiment of the disclosure, the memory may store one or more conversion tables for converting a control signal from a device controller into a code recognizable by one or more devices that are incompatible with the device controller.

According to an embodiment of the disclosure, the one or more conversion tables stored in the memory may be generated when the display apparatus 100 is manufactured. In detail, when the display apparatus 100 is manufactured, the manufacturer of the display apparatus 100 may determine one or more devices and one or more device controllers, which are connectable to the display apparatus 100, generate one or more conversion tables to be used for connecting the devices to the device controllers, respectively, and store the conversion tables in a storage device of the display apparatus 100.

According to an embodiment of the disclosure, the one or more conversion tables may be downloaded from a server after the display apparatus 100 is manufactured. In detail, a user who has purchased the display apparatus 100 may access the server to download the one or more conversion tables for connecting the devices to the device controllers and store them in the display apparatus 100.

According to an embodiment of the disclosure, the one or more conversion tables may be updated on the server as a new device or device controller connectable to the display apparatus 100 being used is added. When a new device or device controller is released after the display apparatus 100 is sold, the manufacturer of the display apparatus 100 may upload, to the server, a conversion table for connecting to the new device or device controller, and the user may access the server to download the uploaded conversion table.

According to an embodiment of the disclosure, when it is determined that the identified device controller is incompatible with the identified device, the display apparatus 100 may perform configuration such that a control signal from the device controller is converted into a code recognizable by the device, based on a conversion table for connecting the device controller to the device. Then, the display apparatus 100 may control the converted code to be provided to the device.

According to an embodiment of the disclosure, the display apparatus 100 may identify an activated device controller and an activated device whenever a control signal is received, and perform control signal conversion according to the identification result.

Alternatively, according to another embodiment of the disclosure, the display apparatus 100 may store control signal conversion configuration information when a predefined event is detected, and perform control signal conversion by using the stored control signal conversion configuration information when a control signal is received. This process will be described in detail with reference to FIGS. 10 to 15.

Hereinafter, an operating method of the display apparatus according to embodiments of the disclosure will be described in detail with reference to FIGS. 6 to 10.

Figure 6:
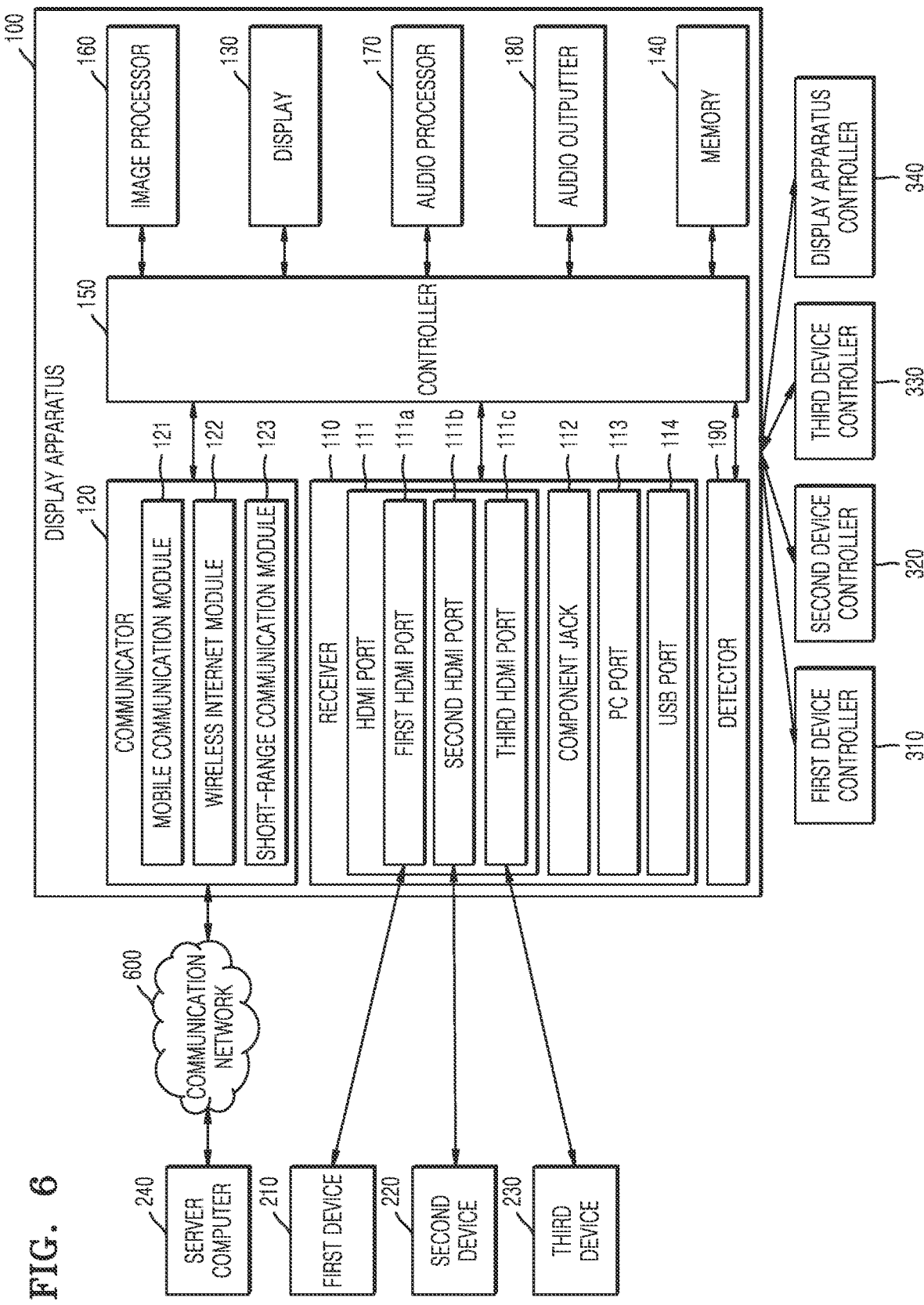
FIG. 6 is a diagram illustrating an example in which three devices and three device controllers are connectable to a display apparatus, according to various embodiments.

FIG. 6 is a diagram illustrating a state in which three devices and three device controllers are connectable to the display apparatus 100, according to an embodiment of the disclosure.

Referring to FIG. 6, the display apparatus 100 may almost be the same as the display apparatus 100 illustrated in FIG. 4, except that the HDMI port 111 may include a first HDMI port 111a, a second HDMI port 111b, and a third HDMI port 111c.

For example, the first device 210 may be connected to the first HDMI port 111a, the second device 220 may be connected to the second HDMI port 111b, and the third device 230 may be connected to the third HDMI port 111c.

In addition, the communicator 120 of the display apparatus 100 may communicate with the server computer 240 through a communication network 600. The server computer 240 is a device including a processor, a memory, a communication interface, and the like to respond to a request from a client computer, and may receive a request from the display apparatus 100 illustrated in FIG. 6 and provide the display apparatus 100 with a response to the request. For example, the server computer 240 may include a game content provider. The server computer 240 may provide a graphical user interface for displaying one or more game content items, and, upon a request from the display apparatus 100 for selecting one of the one or more game content items, provide the requested game content to the display apparatus 100 in, for example, a streaming manner.

Figure 7:
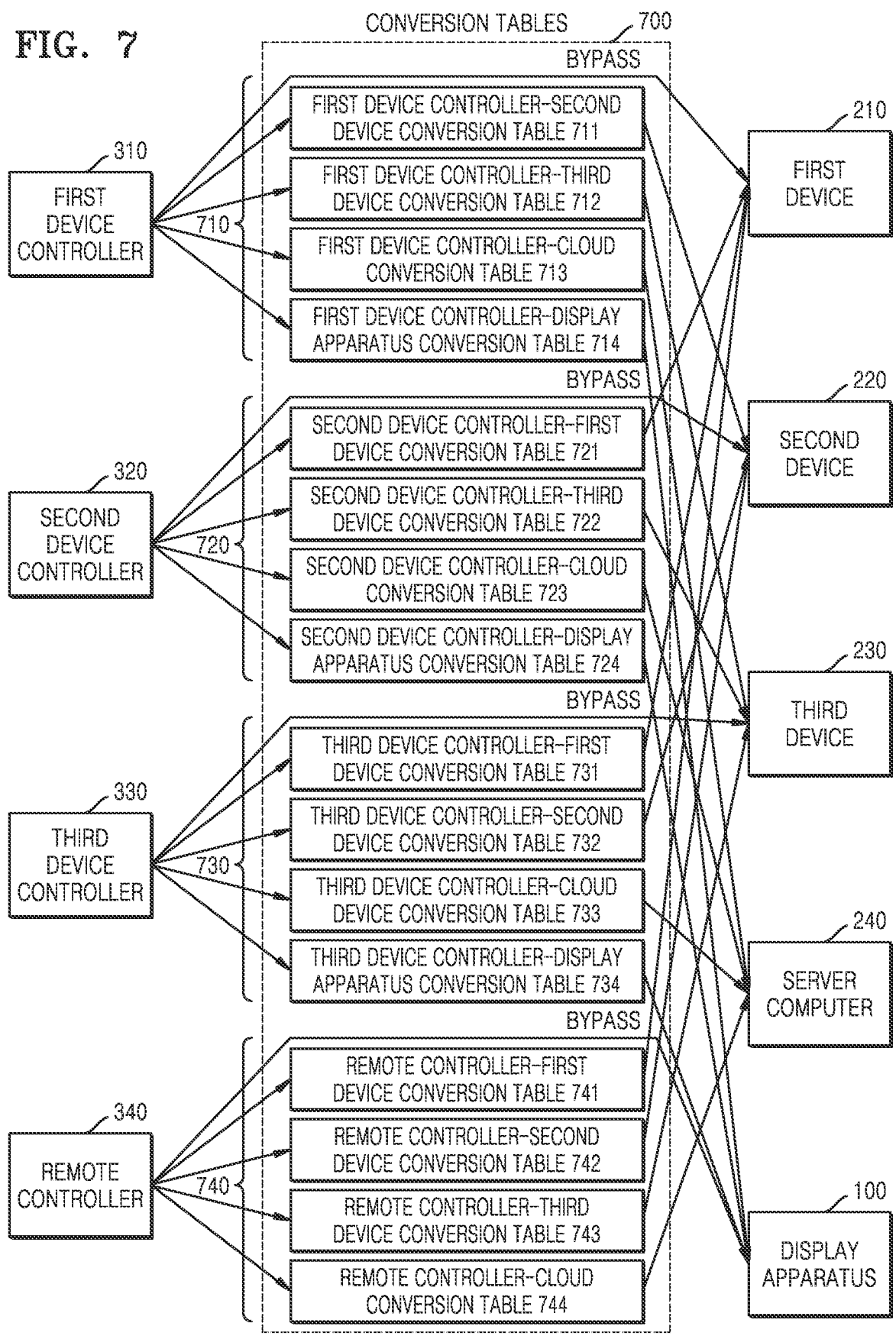
FIG. 7 is a diagram illustrating an example of conversion tables according to various embodiments.

FIG. 7 illustrates an example of a conversion tables according to an embodiment of the disclosure.

Referring to FIG. 7, conversion tables 700 are examples of conversion tables that may be provided in the display apparatus 100 when sources connectable to the display apparatus 100 are the first device 210, the second device 220, the third device 230, and the server computer 240, and device controllers connectable to the display apparatus 100 are the first device controller 310, the second device controller 320, the third device controller 330, and the remote controller 340.

The conversion tables 700 may include conversion tables 710 corresponding to the first device controller 310, conversion tables 720 corresponding to the second device controller 320, conversion tables 730 corresponding to the third device controller 330, and conversion tables 740 corresponding to the remote controller 340.

The conversion tables corresponding to each device controller may include one or more conversion tables for connecting the device controller to the devices connectable to the display apparatus 100, respectively.

The conversion tables 710 corresponding to the first device controller 310 may include a conversion table 711 (hereinafter, also referred to as the first device controller-second device conversion table 711) for connecting the first device controller 310 to the second device 220, a conversion table 712 (hereinafter, also referred to as the first device controller-third device conversion table 712) for connecting the first device controller 310 to the third device 230, a conversion table 713 (hereinafter, also referred to as the first device controller-cloud conversion table 713) for connecting the first device controller 310 to a cloud, and a conversion table 714 (hereinafter, also referred to as the first device controller-display apparatus conversion table 714) for connecting the first device controller 310 to the display apparatus 100. Because the first device controller 310 and the first device 210 may be directly connected to each other, a separate conversion table therefor is not required.

The conversion tables 720 corresponding to the second device controller 320 may include a conversion table 721 (hereinafter, also referred to as the second device controller-first device conversion table 721) for connecting the second device controller 320 to the first device 210, a conversion table 722 (hereinafter, also referred to as the second device controller-third device conversion table 722) for connecting the second device controller 320 to the third device 230, a conversion table 723 (hereinafter, also referred to as the second device controller-cloud conversion table 723) for connecting the second device controller 320 to the cloud, and a conversion table 724 (hereinafter, also referred to as the second device controller-display apparatus conversion table 724) for connecting the second device controller 320 to the display apparatus 100. Because the second device controller 320 and the second device 220 may be directly connected to each other, a separate conversion table therefor is not required.

The conversion tables 730 corresponding to the third device controller 330 may include a conversion table 731 for connecting the third device controller 330 to the first device 210, a conversion table 732 for connecting the third device controller 330 to the second device 220, a conversion table 733 for connecting the third device controller 330 to the sever computer 240, and a conversion table 734 for connecting the third device controller 330 to the display apparatus 100. Because the third device controller 330 and the third device 230 may be directly connected to each other, a separate conversion table therefor is not required.

The conversion tables 740 corresponding to the remote controller 340 may include a conversion table 741 for connecting the remote controller 340 to the first device 210, a conversion table 742 for connecting the remote controller 340 to the second device 220, a conversion table 743 for connecting the remote controller 340 to the third device 230, and a conversion table 744 for connecting the remote controller 340 to the sever computer. Because the remote controller 340 and the display apparatus 100 may be directly connected to each other, a separate conversion table therefor is not required.

Figure 8:
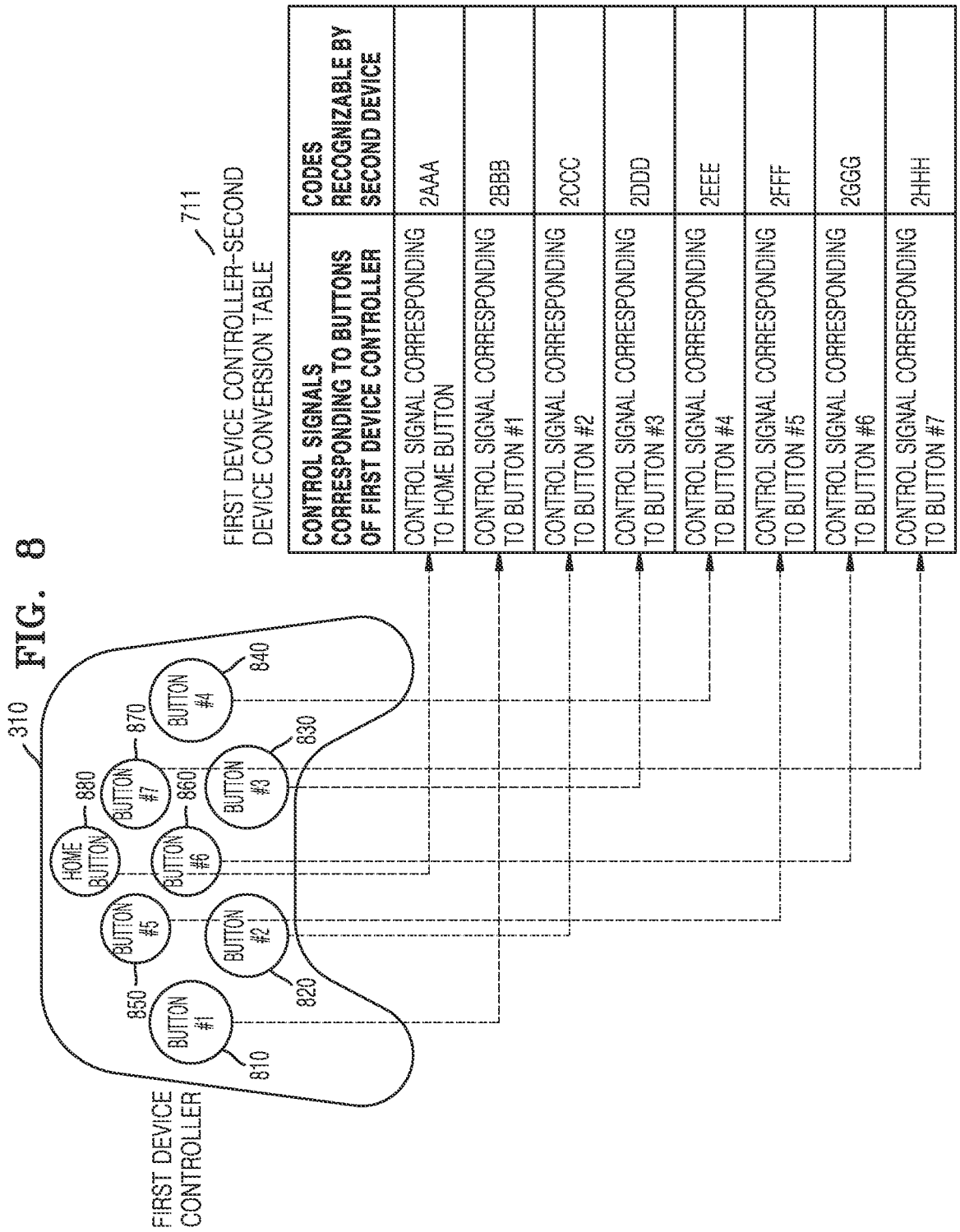
FIG. 8 is a diagram illustrating an example of a conversion table according to various embodiments.

FIG. 8 illustrates a detailed example of a conversion table according to an embodiment of the disclosure.

The conversion table 711 for connecting the first device controller to the second device includes control signals from the first device controller, which correspond to one or more buttons on the first device controller (e.g., 310), and codes recognizable by the second device.

Referring to FIG. 8, for example, the first device controller 310 may include at least one of a button #1 810, a button #2 820, a button #3 830, a button #4 840, a button #5 850, a button #6 860, a button #7 870, and a home button 880. When the first device controller 310 includes one or more buttons as described above, the conversion table 711 for connecting the first device controller to the second device may include pairs of each button and a corresponding code recognizable by the second device.

In detail, the conversion table 711 may include pairs of (a control signal corresponding to a button on the first device controller, and a code corresponding to the control signal and recognizable by the second device) for example as follows:

(Control signal corresponding to home button, 2AAA)
(Control signal corresponding to button #1, 2BBB)
(Control signal corresponding to button #2, 2CCC)
(Control signal corresponding to button #3, 2DDD)
(Control signal corresponding to button #4, 2EEE)
(Control signal corresponding to button #5, 2FFF)
(Control signal corresponding to button #6, 2GGG)
(Control signal corresponding to button #7, 2HHH)

When a control signal generated by pressing the home button of the first device controller 310 is received, the display apparatus 100 may convert, based on the conversion table 711, the home button control signal into the code "2AAA", which corresponds to the home button control signal, and transmit the code "2AAA" to the second device.

Although FIG. 8 illustrates an example in which the first device controller 310 includes the home button 880 and seven buttons, this is merely illustrative. The number of buttons included in each device controller may vary, and the corresponding conversion table may include pairs of (control signal, code) according to the number of buttons on the device controller.

Figure 9:
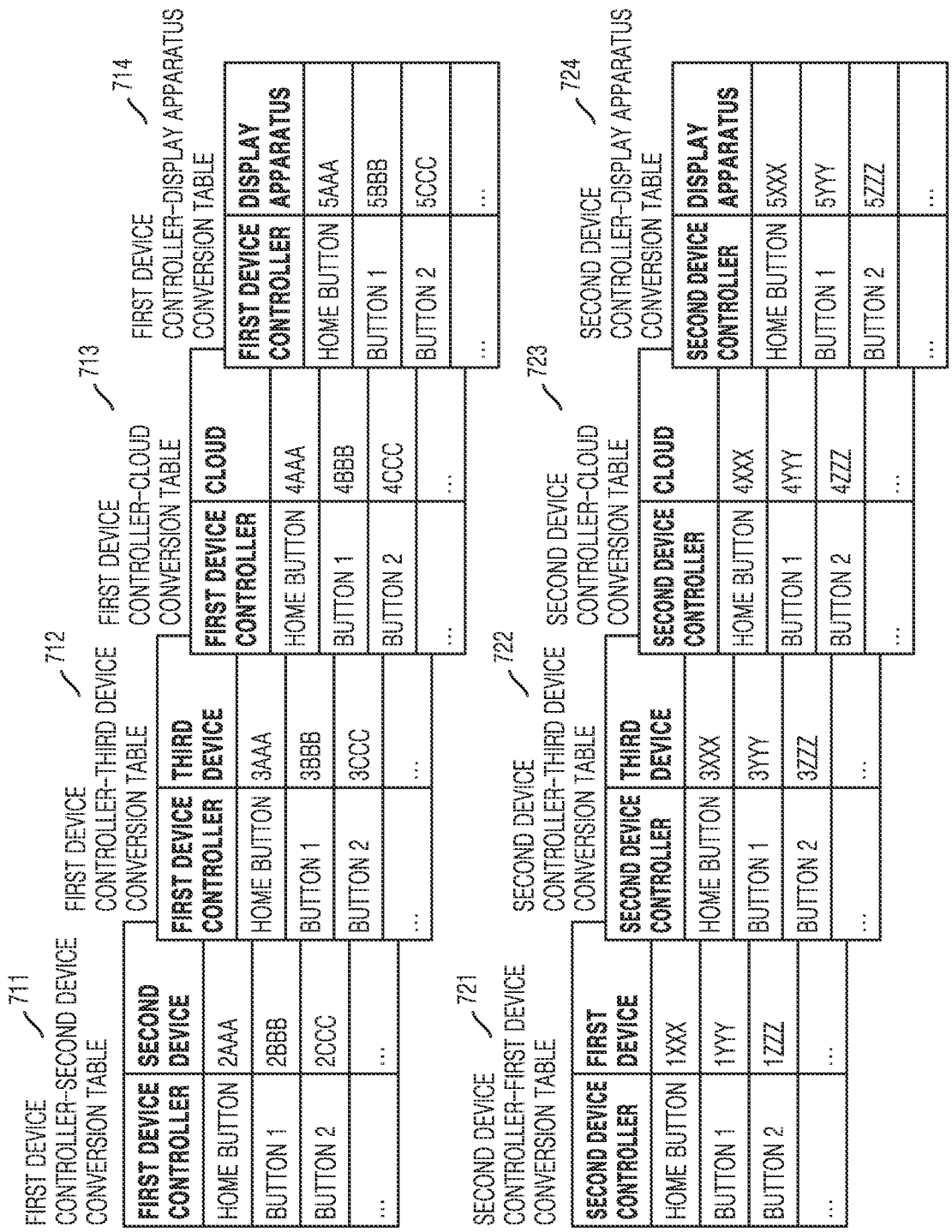
FIG. 9 is a diagram illustrating one or more conversion tables corresponding to a first device controller and one or more conversion tables corresponding to a second device controller, according to various embodiments.

FIG. 9 illustrates one or more conversion tables corresponding to the first device controller and one or more conversion tables corresponding to the second device controller, according to an embodiment of the disclosure.

Referring to FIG. 9, the conversion tables corresponding to the first device controller may include the first device controller-second device conversion table 711, the first device controller-third device conversion table 712, the first device controller-cloud conversion table 713, and the first device controller-display apparatus conversion table 714.

In the first device controller-second device conversion table 711, a code "2AAA" is mapped to the home button, a code "2BBB" is mapped to the button #1, and a code "2CCC" is mapped to the button #2. In the first device controller-third device conversion table 712, a code "3AAA" is mapped to the home button, a code "3BBB" is mapped to the button #1, and a code "3CCC" is mapped to the button #2. In the first device controller-cloud conversion table 713, a code "4AAA" is mapped to the home button, a code "4BBB" is mapped to the button #1, and a code "4CCC" is mapped to the button #2. In the first device controller-display apparatus conversion table 714, a code "5AAA" is mapped to the home button, a code "5BBB" is mapped to the button #1, and a code "5CCC" is mapped to the button #2.

According to the example conversion tables as described above, when a control signal corresponding to the home button is received from the first device controller and the source activated on the display apparatus 100 is the second device, the display apparatus 100 may for example provide the second device with the code "2AAA" corresponding to the home button based on the first device controller-second device conversion table 711 (e.g., see FIG. 9). When a control signal corresponding to the home button is received from the first device controller and the source activated on the display apparatus 100 is the display apparatus 100 itself, the display apparatus 100 may provide the display apparatus with the code "5AAA" corresponding to the home button based on the first device controller-display apparatus conversion table 714.

The conversion tables corresponding to the second device controller may include the second device controller-first device conversion table 721, the second device controller-third device conversion table 722, the second device controller-cloud conversion table 723, and the second device controller-display apparatus conversion table 724.

In the second device controller-first device conversion table 721, a code "1XXX" is mapped to the home button, a code "1YYY" is mapped to the button #1, and a code "1ZZZ" is mapped to the button #2. In the second device controller-third device conversion table 722, a code "3XXX" is mapped to the home button, a code "3YYY" is mapped to the button #1, and a code "3ZZZ" is mapped to the button #2. In the second device controller-cloud conversion table 723, a code "4XXX" is mapped to the home button, a code "4YYY" is mapped to the button #1, and a code "4ZZZ" is mapped to the button #2. In the second device controller-display apparatus conversion table 724, a code "5XXX" is mapped to the home button, a code "5YYY" is mapped to the button #1, and a code "5ZZZ" is mapped to the button #2.

According to the conversion tables as described above, when a control signal corresponding to the home button is received from the second device controller and the source activated on the display apparatus 100 is the third device, the display apparatus 100 may provide the third device with the code "3XXX" corresponding to the home button based on the second device controller-third device conversion table 722. When a control signal corresponding to the home button is received from the second device controller and the source activated on the display apparatus 100 is the cloud, the display apparatus 100 may provide the display apparatus with the code "4XXX" corresponding to the home button based on the second device controller-cloud conversion table 723.

Although the conversion tables corresponding to the third device controller and the conversion tables corresponding to the remote controller are not illustrated, they may operate in the same manner.

Figure 10:
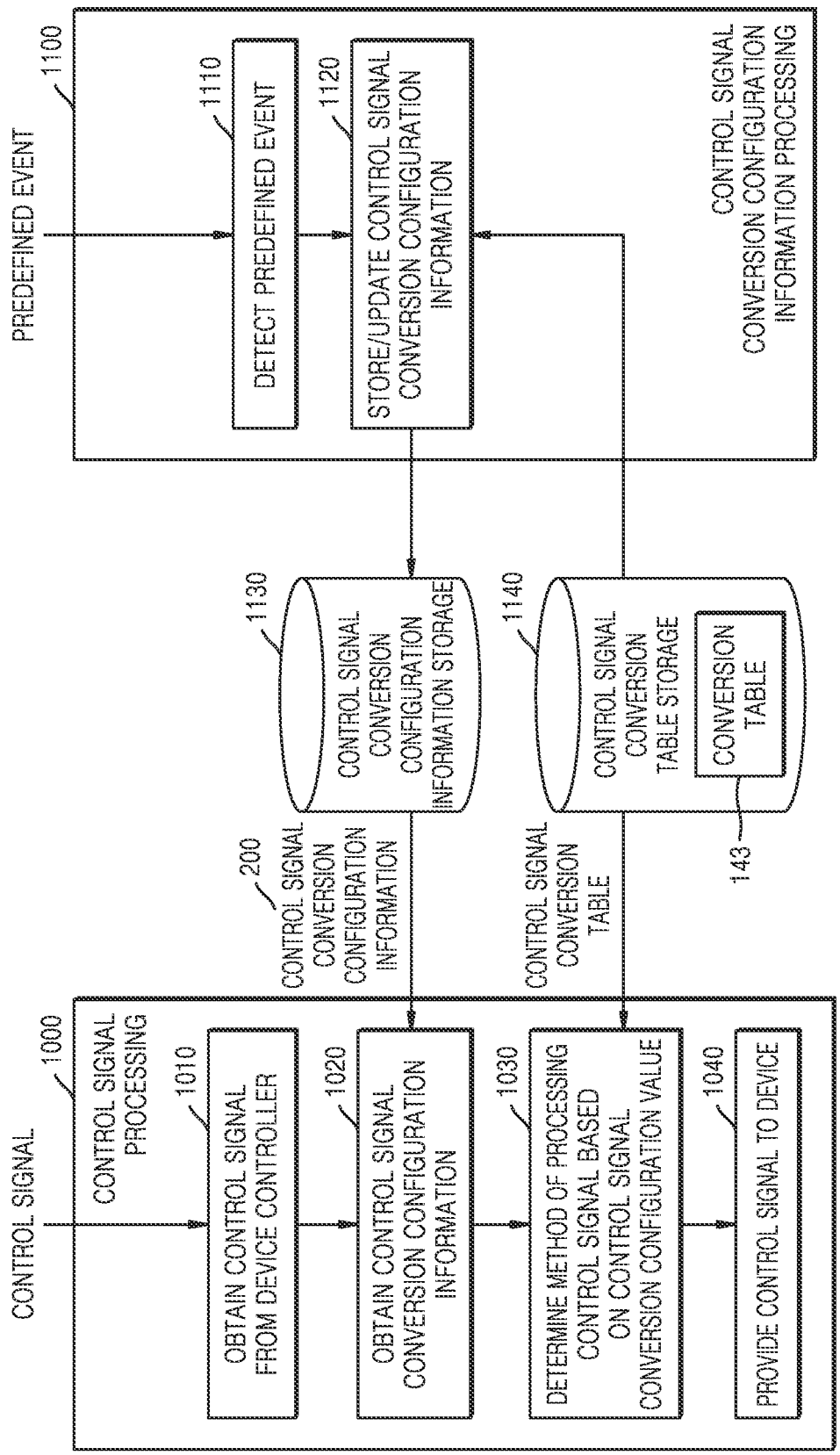
FIG. 10 is a diagram illustrating an example process, performed by a display apparatus, of receiving and processing a control signal from a device controller, according to various embodiments.

FIG. 10 illustrates an example of a flowchart of a process, performed by the display apparatus 100, of receiving and processing a control signal from a device controller, according to an embodiment of the disclosure.

Referring to FIG. 10, the process performed by the display apparatus 100 may be largely divided into a process 1000 for processing a control signal from a device controller and a process 1100 for processing control signal conversion configuration information.

The process 1000 for processing a control signal is to, when the display apparatus 100 receives a control signal from a device controller, convert the control signal into an appropriate code recognizable by a target device, which is the destination of the control signal, and provide the converted code to the target device.

The process 1100 for processing control signal conversion configuration information is to store or update control signal conversion configuration information used for processing a control signal.

First, the process 1000 of processing a control signal will be described.

In operation 1010, the display apparatus 100 may obtain a control signal received from a remote controller or a device controller. The display apparatus 100 may receive a control signal from the remote controller through infrared communication or BT communication. The display apparatus 100 may receive a control signal from the device controller through BT communication or USB.

In operation 1020, the display apparatus 100 may obtain control signal conversion configuration information from a control signal conversion configuration information storage 1130. The control signal conversion configuration information may include configuration information for allowing a control signal from a device controller to be transmitted to a target device, which is the destination of the control signal. The control signal conversion configuration information may include information about the device controller activated on the display apparatus 100, information about the device activated on the display apparatus 100, and information about a particular conversion table used for connecting the activated device controller to the activated device. The information about the activated device controller may include an identifier of the activated device controller, the information about the activated device may include an identifier of the activated device, and the information about the conversion table may include an index or identifier of the conversion table. As described with reference to FIGS. 8 and 9, the conversion table includes information for converting control signals corresponding to one or more buttons on the device controller into codes recognizable by the device, respectively.

In operation 1030, the display apparatus 100 may determine a method of processing the control signal currently received by the display apparatus 100, based on the control signal conversion configuration information and the control signal conversion table. A control signal conversion table 143 having an identifier included in the control signal conversion configuration information may be retrieved from among one or more control signal conversion tables stored in a control signal conversion table storage 1140. In detail, when the control signal conversion configuration information indicates that the device controller is compatible with and thus directly communicable with the device, the display apparatus 100 may determine to directly transmit, to the device, the control signal from the device controller. When the device controller is incompatible with and thus unable to directly communicate with the device and a corresponding control signal conversion table exists, the display apparatus 100 may determine to convert the control signal from the device controller into a code recognizable by the device by using the control signal conversion table.

In operation 1040, the display apparatus 100 may directly provide the control signal to the device (e.g., bypass) or convert the control signal into a code recognizable by the device and provide the converted code to the device, according to the determination result in operation 1030.

Figure 11:
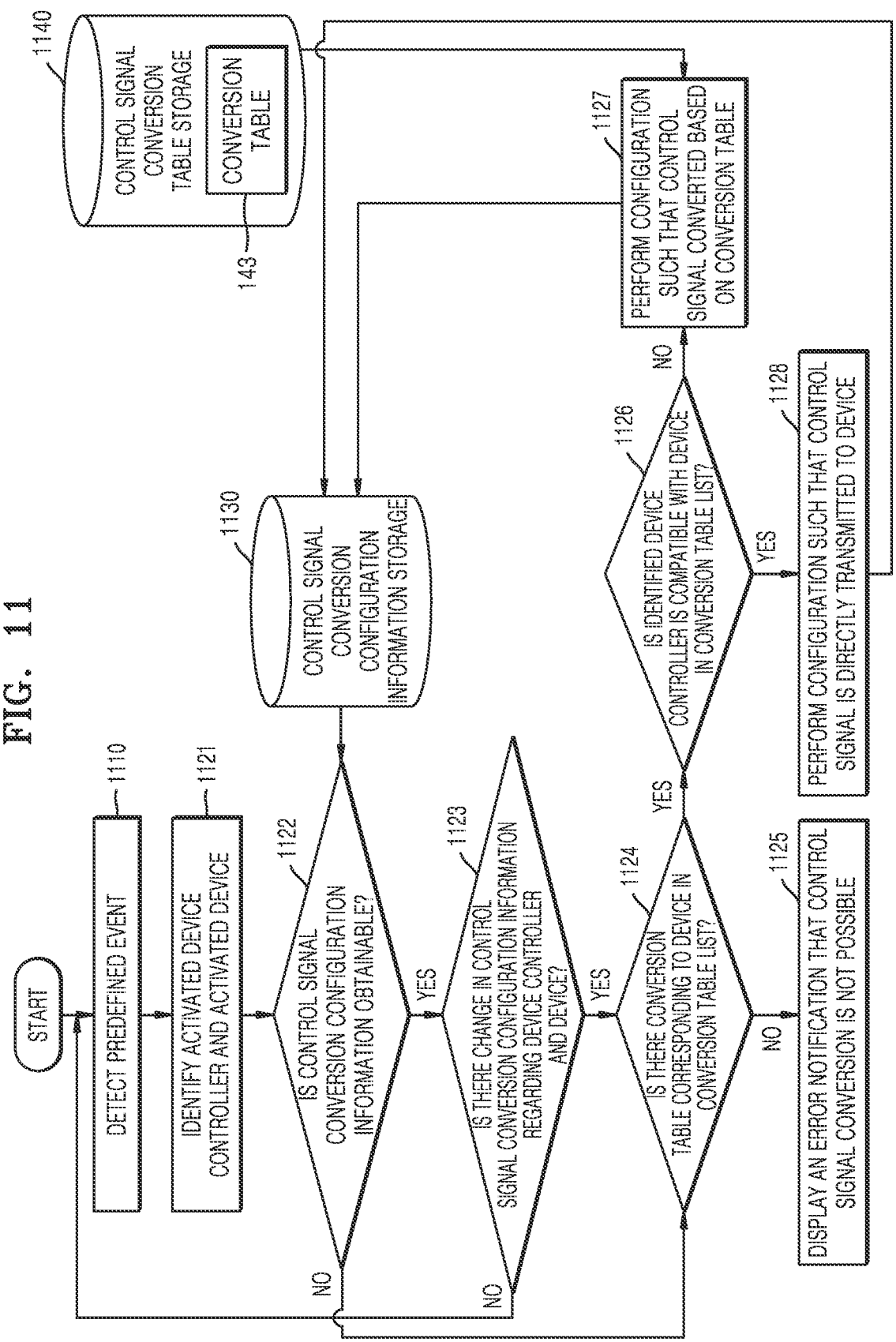
FIG. 11 is a flowchart illustrating an example process, performed by a display apparatus, of processing control signal conversion configuration information, according to various embodiments.

FIG. 11 is a flowchart of an example of a process, performed by a display apparatus, of processing control signal conversion configuration information, according to an embodiment of the disclosure.

Referring to FIG. 11, in operation 1110, the display apparatus 100 may detect a predefined event.

According to an embodiment of the disclosure, the predefined event may include at least one of detection of activation of a device controller, detection of activation of a device, detection of a change in selection of a source device, or detection of activation of a game hub. The detection of activation of a device controller may indicate that the display apparatus and the device controller are detected to be communicatively connected to each other. The detection of activation of a device may indicate that the display apparatus and the device are detected to be communicatively connected to each other. The detection of a change in selection of a source device may indicate that the display apparatus detects that the source device has been changed by a user or the like. The detection of activation of a game hub may indicate that the game hub is detected to be activated by a particular user input. For example, the game hub may be activated by a particular button input on the device controller connected to the display apparatus, and the activation of the game hub may be detected by receiving a control signal corresponding to the particular button input. Alternatively, as a command for activating the game hub is received via a menu selection through a graphical user interface provided in the display apparatus or a voice command, the activation of the game hub may be detected.

In operation 1121, the display apparatus 100 may identify the activated device controller and the activated device.

The device controller activated on the display apparatus may be a device controller connected to and thus able to communicate with the display apparatus. The device activated on the display apparatus may be a device connected to and thus able to communicate with the display apparatus.

According to an embodiment of the disclosure, the display apparatus may perform a connection operation with the activated device controller, obtain identification information of the device controller received through the connection operation, and identify the device controller based on the identification information. For example, the display apparatus 100 may receive, from the device controller, the identification information of the device controller for identifying the device controller in an initial stage of BT communication or USB communication connection with the device controller. For example, the display apparatus 100 may receive, from a remote controller, identification information of the remote controller for identifying the remote controller in an initial stage of infrared communication or BT communication connection with the remote controller.

According to an embodiment of the disclosure, the display apparatus may obtain identification information of the device received through an operation of recognizing the device, and identify the activated device based on the identification information. For example, the display apparatus 100 may receive the identification information of the device for identifying the device when connecting to the device through HDMI communication or USB communication.

In operation 1122, the display apparatus 100 may determine whether corresponding control signal conversion configuration information is obtainable.

In detail, the display apparatus 100 may determine whether the control signal conversion configuration information corresponding to the identified device controller is obtainable from the control signal conversion configuration information storage 1130. The control signal conversion configuration information includes control signal conversion configurations for connecting the activated device controller to the activated device.

Figure 12:
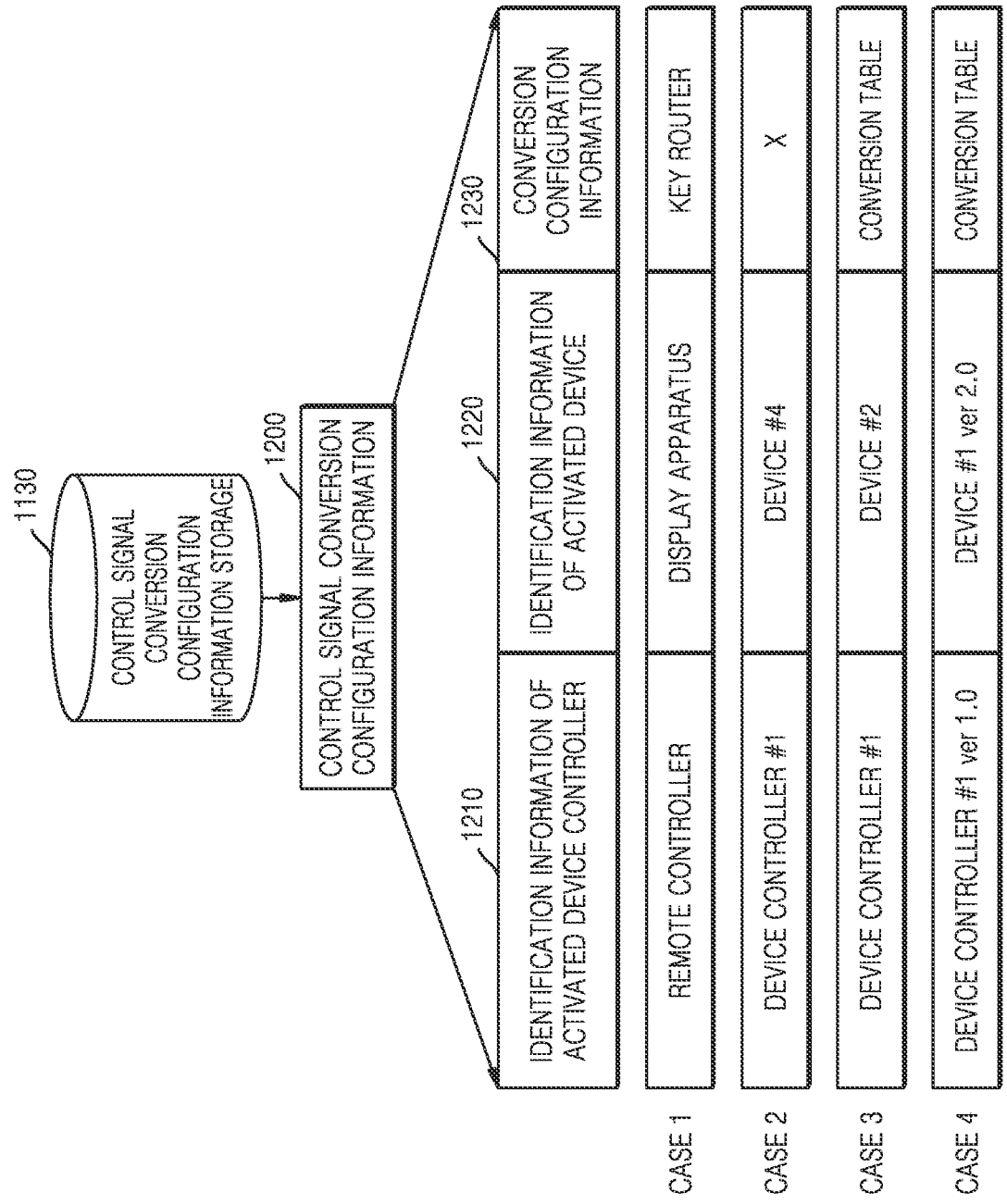
FIG. 12 is a diagram illustrating an example of control signal conversion configuration information according to various embodiments.

FIG. 12 illustrates an example of control signal conversion configuration information.

Referring to FIG. 12, control signal conversion configuration information 1200 stored in the control signal conversion configuration information storage 1130 may include identification information 1210 of the activated device controller, identification information 1220 of the activated device, and conversion configuration information 1230 for connecting the activated device to the activated device controller. The identification information 1210 of the activated device controller is information for identifying the activated device controller, and may include one or more of a manufacturer name, a model name, a unique number, and version information of the device controller. The identification information 1220 of the activated device may include one or more of a manufacturer name, a model name, a unique number, and version information of the device. The conversion configuration information 1230 for connecting the activated device to the activated device controller may include configurations determined for connecting the activated device to the activated device controller. The conversion configuration information 1230 may include a value indicating direct transmission, a value indicating a key router, identification information of a conversion table, or the like.

When the control signal conversion configuration information corresponding to the identified device controller is not stored in the control signal conversion configuration information storage 1130, the display apparatus 100 may newly generate control signal conversion configuration information corresponding to the identified device controller, and thus may perform operation 1124 (e.g., see FIG. 11).

When the control signal conversion configuration information corresponding to the identified device controller is stored in the control signal conversion configuration information storage 1130, the display apparatus 100 may obtain the control signal conversion configuration information corresponding to the identified device controller.

In operation 1123, the display apparatus 100 may determine whether there is a difference or change between the identification information of the device included in the obtained control signal conversion configuration information and information of the device identified in operation 1121. When the identification information of the device included in the obtained control signal conversion configuration information is identical to the information of the device identified in operation 1121, it is unnecessary to update the control signal conversion configuration information, and thus the display apparatus 100 may proceed to operation 1110 to be in a standby state for detection of a next predefined event.

In operation 1123, when the identification information of the device included in the obtained control signal conversion configuration information is different from the information of the device identified in operation 1121, e.g., the device has been changed, operation 1124 may be performed to update the control signal conversion configuration information according to the changed device. For example, when the identification information of the device included in the control signal conversion configuration information from the control signal conversion configuration information storage 1130 indicates a device #2, and the identification information of the device identified in operation 1121 indicates a cloud computer, it may be necessary to update the control signal conversion configuration information to be appropriate for connecting the device controller to the cloud computer.

In operation 1124, the display apparatus 100 may determine whether the identified device exists in one or more conversion table lists stored in the control signal conversion table repository 1140.

When it is determined that the identified device exists in the one or more conversion table lists stored in the control signal conversion table storage 1140, there is no information about the device to be used for conversion of a control signal from the device controller, and thus the process may proceed to operation 1125.

In operation 1125, the display apparatus displays an error notification indicating that control signal conversion is not possible, on the display. For example, as in Case 2 shown in FIG. 12, when the device controller identified in operation 1121 is a device controller #1 and the identified device is a device #4, because the device #4 is not included in the conversion table list, the conversion configuration information may include a null value.

When it is determined, in operation 1124, that the identified device exists in the one or more conversion table lists stored in the control signal conversion table storage 1140, the process may proceed to operation 1126.

In operation 1126, the display apparatus 100 may determine whether the identified device controller is compatible with the device in the control signal conversion table list. For example, when the device controller identified in operation 1121 is a device of version 1.0 from a manufacturer A, and identification information of the device in the control signal conversion table list indicates 'device of version 1.0 from the manufacturer A', it may be determined that the device controller and the device are compatible with each other because they are from the same manufacturer and are of the same version. For example, when the device controller identified in operation 1121 is a device of version 2.0 from the manufacturer A, and identification information of the device in the control signal conversion table list indicates 'device of version 1.0 from the manufacturer A', the device controller and the device may be compatible or incompatible with each other because they are from the same manufacturer but are of different versions. Therefore, even in this case, e.g., when the device controller and the device are from the same manufacturer but have different version information, the display apparatus 100 is able to determine whether they are compatible with each other by using pre-stored information regarding their compatibility.

When it is determined that they are incompatible with each other, the process may proceed to operation 1127 to convert a control signal into a code recognizable by the identified device.

When it is determined that they are compatible with each other, the process may proceed to operation 1128. In operation 1128, the display apparatus 100 may perform configuration such that a control signal from the identified device controller is directly transmitted to the device. Then, the configuration may be stored in the control signal conversion configuration information storage 1130.

In operation 1127, the display apparatus 100 may perform configuration such that a control signal from the identified device controller is converted based on the conversion table. Then, the configuration may be stored in the control signal conversion configuration information storage 1130. For example, as in Case 1 shown in FIG. 12, when the controller identified in operation 1121 is the remote controller and the identified device is the display apparatus, the conversion configuration information may include a value indicating a key router. For example, as in Case 3 shown in FIG. 12, when the device controller identified in operation 1121 is the device controller #1 and the identified device is the device #2, the conversion configuration information may include information about the conversion table 711 for connecting the device controller #1 to the device #2. For example, as in Case 4 shown in FIG. 12, when the device controller identified in operation 1121 is the device controller #5 ver 1.0 and the identified device is the device #5 ver 2.0, the conversion configuration information may include information about the conversion table for connecting the device controller #5 ver 1.0 to the device #5 ver 2.0.

Hereinafter, an operation example of the display apparatus will be described in detail with reference to FIGS. 13 to 15.

Figure 13:
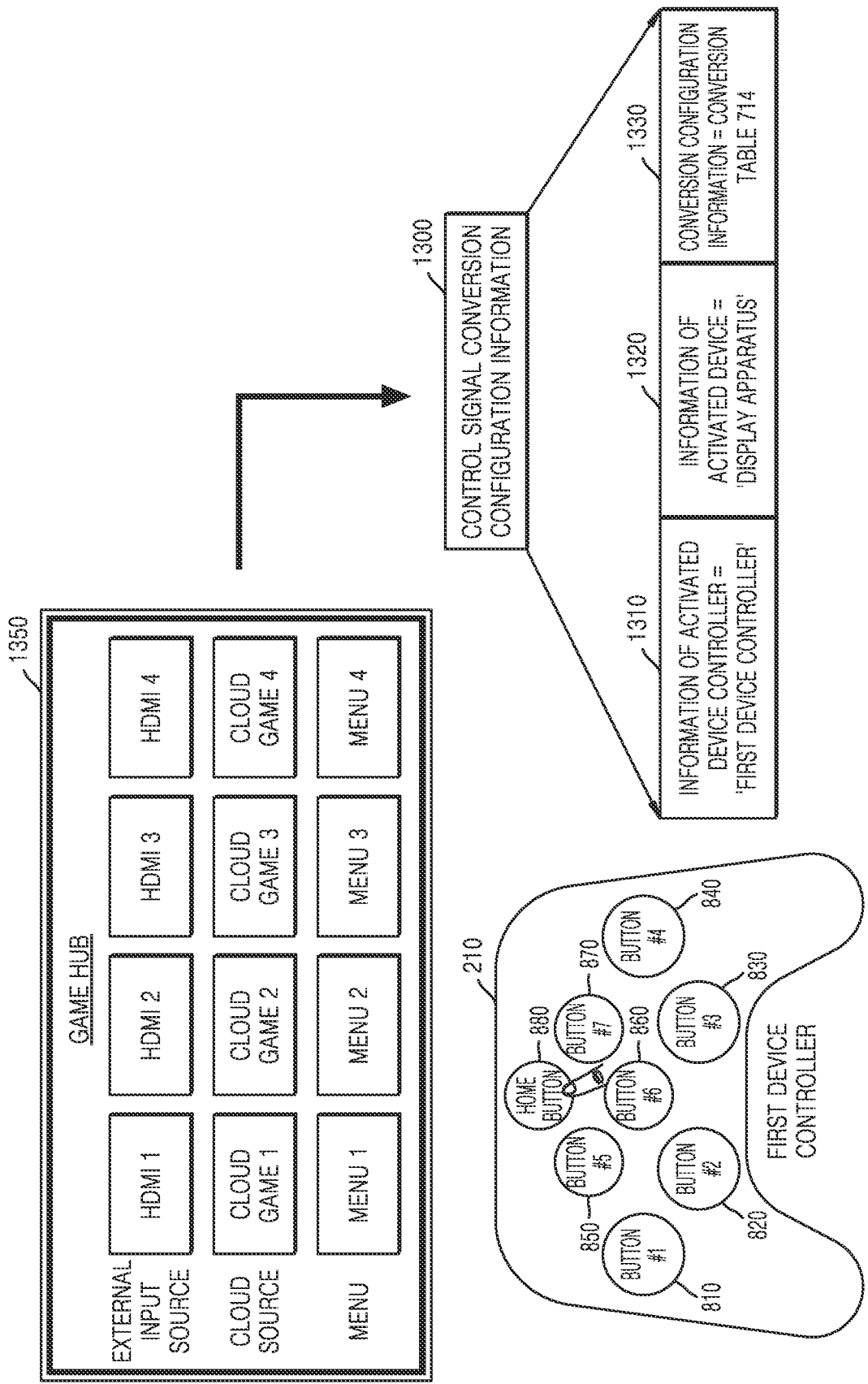
FIG. 13 is a diagram illustrating an example operation of a display apparatus in a situation where a game hub is selected, according to various embodiments.

FIG. 13 is a diagram for describing an operation of a display apparatus in a situation where a game hub is selected, according to an embodiment of the disclosure.

Referring to FIG. 13, the first device controller 310 may be connected to the display apparatus 100 through, for example, BT communication. In a BT communication pairing process, the display apparatus 100 may obtain identification information of the first device controller 310.

After the first device controller 310 is connected to the display apparatus 100, the user may press, for example, the home button 880 of the first device controller 310. The home button 880 of the first device controller 310 may be configured to, when pressed, instruct the display apparatus 100 to display a game hub home screen. Accordingly, when a control signal corresponding to the home button 880 is received from the first device controller 310, the display apparatus 100 may display a game hub home screen 1350 in response to the control signal. In addition, the display apparatus 100 may determine that a predefined event occurs, as the control signal for selecting the game hub home screen, e.g., the control signal corresponding to the home button 880, is detected. Accordingly, the display apparatus 100 may generate control signal conversion configuration information 1300 corresponding to the first device controller. The display apparatus 100 may set, in the control signal conversion configuration information 1300, information 1310 of the activated device controller as 'First device controller', information 1320 of the activated device as 'Display apparatus', and conversion configuration information 1330 to be the conversion table 714 for connecting the first device controller to the display apparatus.

When a control signal is received from the first device controller 310 after the control signal conversion configuration information 1300 is set as described above, the display apparatus 100 may convert the control signal corresponding to a button from the first device controller 310 into a code recognizable by the display apparatus 100, based on the conversion table 714 set in the control signal conversion configuration information 1300, and provide the code to the display apparatus 100.

Referring to FIG. 13, the layout of the game hub home screen 1350 may be variously determined, and may include HDMI 1, HDMI 2, HDMI 3, and HDMI 4 as menus for selecting an external input source, Cloud Game 1, Cloud Game 2, Cloud Game 3, and Cloud Game 4 as menus for selecting a cloud source, and Menu 1, Menu 2, Menu 3, and Menu 4 as control menus.

For example, when the user presses up, down, left, and right buttons on the first device controller 310 to move a cursor between the menus on the game hub home screen 1350, the display apparatus 100 may control the graphical user interface of the game hub home screen 1350 by providing the game hub with codes corresponding to the control signals based on the conversion table 714.

Figure 14:
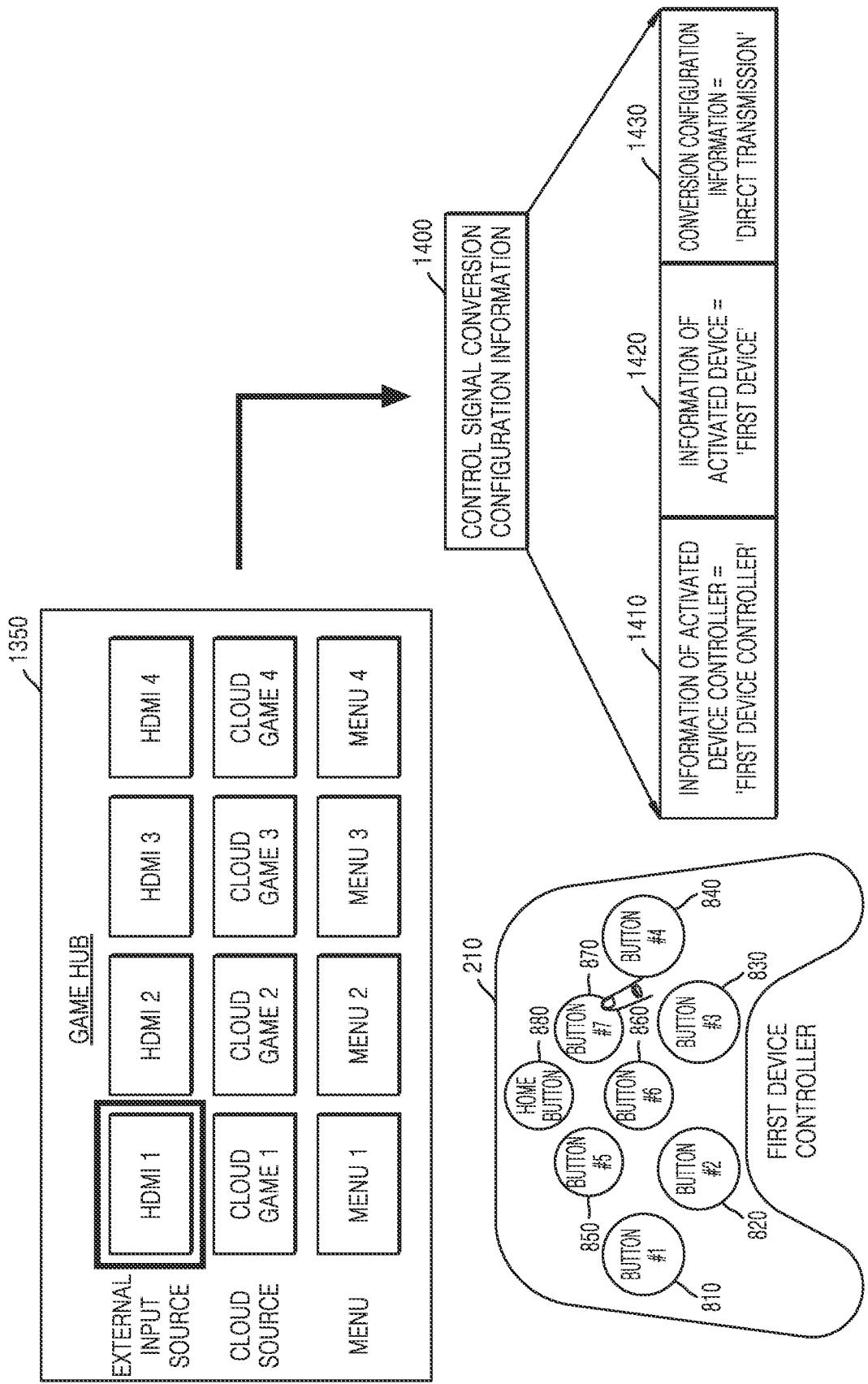
FIG. 14 is a diagram illustrating an example operation of a display apparatus in a situation where High-Definition Multimedia Interface (HDMI) 1 is selected, according to various embodiments.

FIG. 14 is a diagram for describing an operation of a display apparatus in a situation where HDMI 1 is selected, according to an embodiment of the disclosure.

Referring to FIG. 14, when the user selects, as a source of game content, HDMI 1 connected to the first device by pressing a button on the first device controller 310, the display apparatus 100 may receive a control signal for selecting HDMI 1. The display apparatus 100 may determine that a predefined event occurs, as the control signal for selecting one of external input sources is detected. Accordingly, the display apparatus 100 may update the control signal conversion configuration information by performing the operations illustrated in FIG. 11 upon the occurrence of the predefined event.

The display apparatus 100 may set, in the control signal conversion configuration information 1400, information 1410 of the activated device controller as 'First device controller', information 1420 of the activated device as 'First device', and conversion configuration information 1430 as 'Direct transmission'. Because the activated device controller is the first device controller and the activated device is the first device, both devices are able to directly communicate with each other, and thus the conversion configuration information 1430 may be set as "Direct transmission".

When a control signal is received from the first device controller 310 after the control signal conversion configuration information 1400 is set as described above, the display apparatus 100 may directly transmit, to the first device connected to HDMI 1, the control signal corresponding to a button from the first device controller 310, based on "Direct transmission" set in the control signal conversion configuration information 1400.

Figure 15:
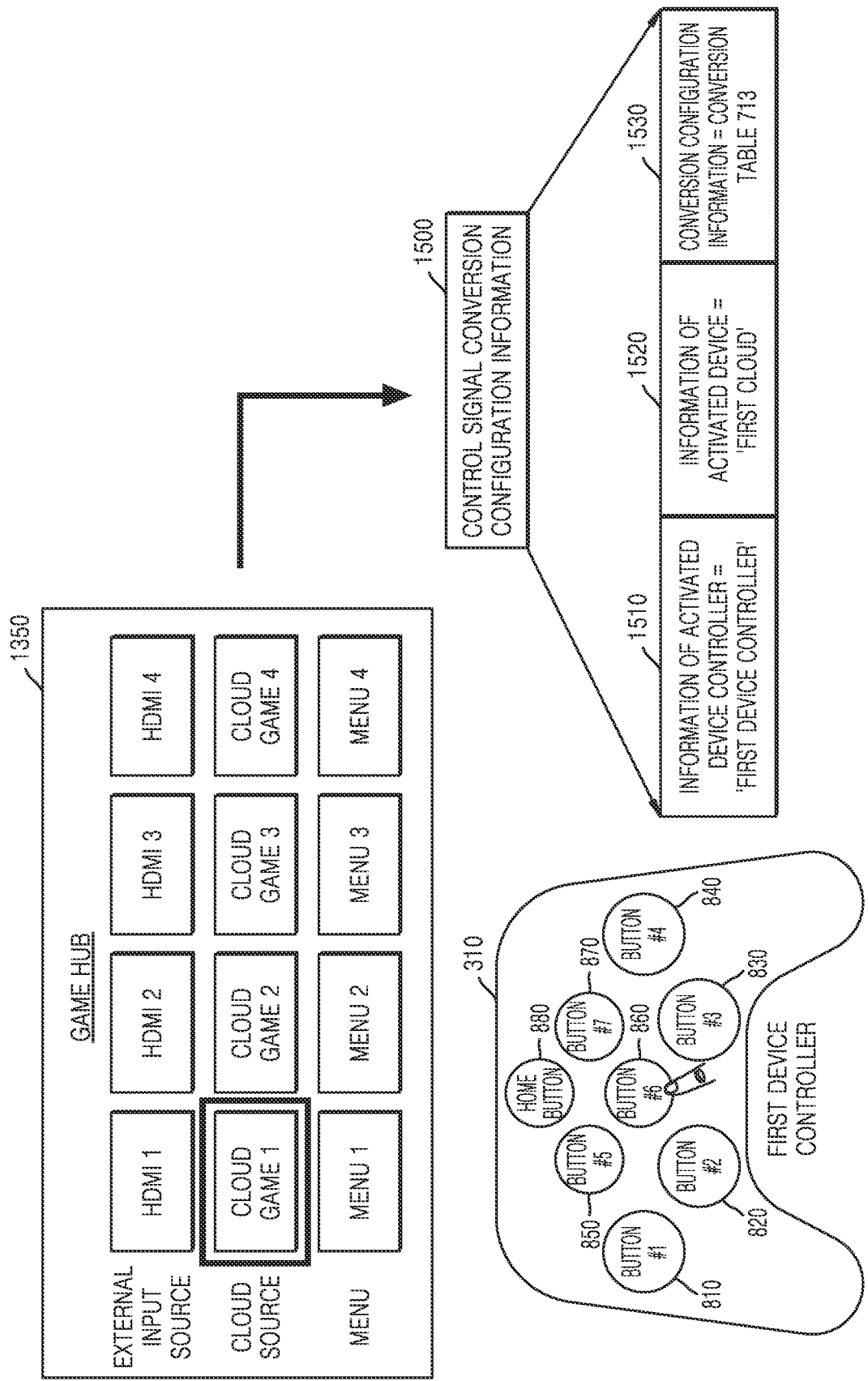
FIG. 15 is a diagram illustrating an example operation of a display apparatus in a situation where Cloud Game 1 is selected, according to various embodiments.

FIG. 15 is a diagram for describing an operation of a display apparatus in a situation where Cloud Game 1 is selected, according to an embodiment of the disclosure.

Referring to FIG. 15, when the user selects, as a source of game content, Cloud Game 1 connected to a first server computer by pressing a button on the first device controller 310, the display apparatus 100 may receive a control signal for selecting Cloud Game 1. The display apparatus 100 may determine that a predefined event occurs, as the control signal for selecting one of external input sources is detected. Accordingly, the display apparatus 100 may update the control signal conversion configuration information by performing the operations illustrated in FIG. 11 upon the occurrence of the predefined event.

The display apparatus 100 may set, in control signal conversion configuration information 1500, information 1510 of the activated device controller as 'First device controller', information 1520 of the activated device as 'First cloud', and conversion configuration information 1530 to be the conversion table 713 for connecting the first device controller to the first cloud.

When a control signal is received from the first device controller 310 after the control signal conversion configuration information 1500 is set as described above, the display apparatus 100 may convert the control signal corresponding to a button from the first device controller 310 into a code recognizable by the first cloud, based on the conversion table 713 set in the control signal conversion configuration information 1500, and provide the code to the server computer, which corresponds to the first cloud.

Figure 16:
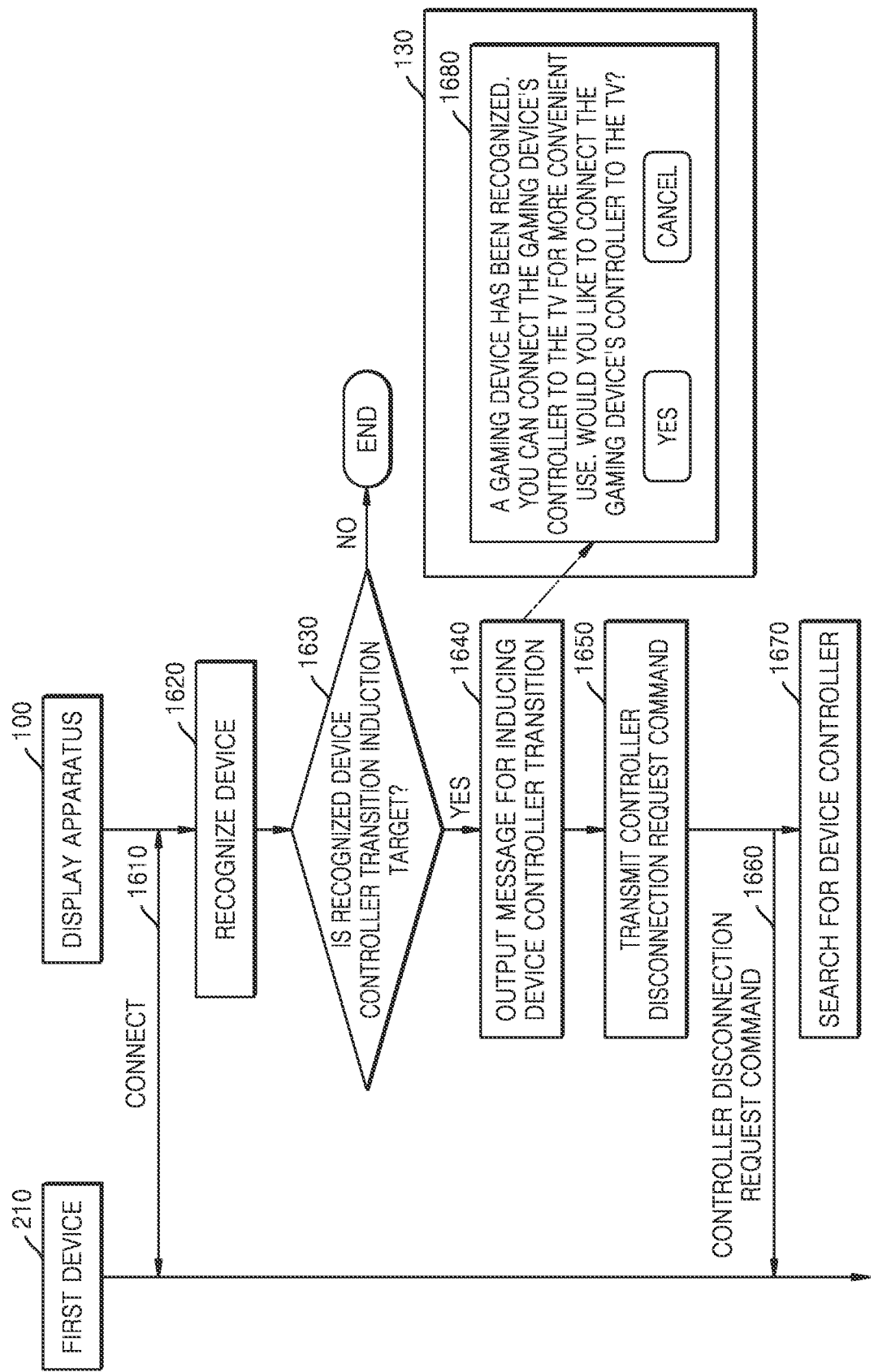
FIG. 16 is a flowchart illustrating an example operation, performed by a display apparatus, of inducing a device controller to be connected to the display apparatus, according to various embodiments.

FIG. 16 is a flowchart of an operation process, performed by the display apparatus 100, of inducing a device controller to be connected to the display apparatus 100, according to an embodiment of the disclosure.

Referring to FIG. 16, in operation 1610, the display apparatus 100 and the first device 210 may perform a connection operation. For example, the display apparatus 100 and the first device 210 may be connected to each other through USB communication or HDMI communication.

In operation 1620, the display apparatus 100 may recognize the first device by obtaining identification information of the first device based on information transmitted and received in operation 1610.

In operation 1630, the display apparatus 100 may determine whether the recognized first device is an electronic device designated as a controller transition induction target. The display apparatus 100 may determine a particular type of electronic device as a controller transition induction target. In detail, a useful type of electronic device that may be connected to the display apparatus 100 to provide content and may be controlled by using a device controller directly connected to the display apparatus 100 may be determined as a controller transition induction target. For example, in case of a dedicated game device for providing game content, it may be useful for the display apparatus 100 to connect the first device controller corresponding to the first device to the display apparatus 100 in order to provide a more convenient gaming environment through a game hub provided by the display apparatus 100.

When the recognized device is determined not to be a controller transition induction target, the process may be terminated.

When it is determined that the recognized device is a controller transition induction target, the process may proceed to operation 1640.

In operation 1640, the display apparatus 100 may output, to the display, a message for inducing connection transition to the device controller. For example, the display apparatus 100 may display a message 1680 'A gaming device has been recognized. You can connect the gaming device's controller to the TV for more convenient use. Would you like to connect the gaming device's controller to the TV?', on the display 130. When the user select 'Yes' in response to the message 1680, the display apparatus 100 may perform an operation for controller transition. Of course, the operation for controller transition may be immediately performed without outputting the message 1680.

In operation 1650, the display apparatus 100 may transmit a controller disconnection request command 1660 to the first device 210. For example, the display apparatus 100 may transmit the controller disconnection request command 1660 to the first device through an area such as a transition-minimized differential signaling (TMDS) field according to the HDMI communication standard.

In operation 1670, the display apparatus 100 may search for the first device controller for controlling the first device through, for example, BT communication.

Figure 17:
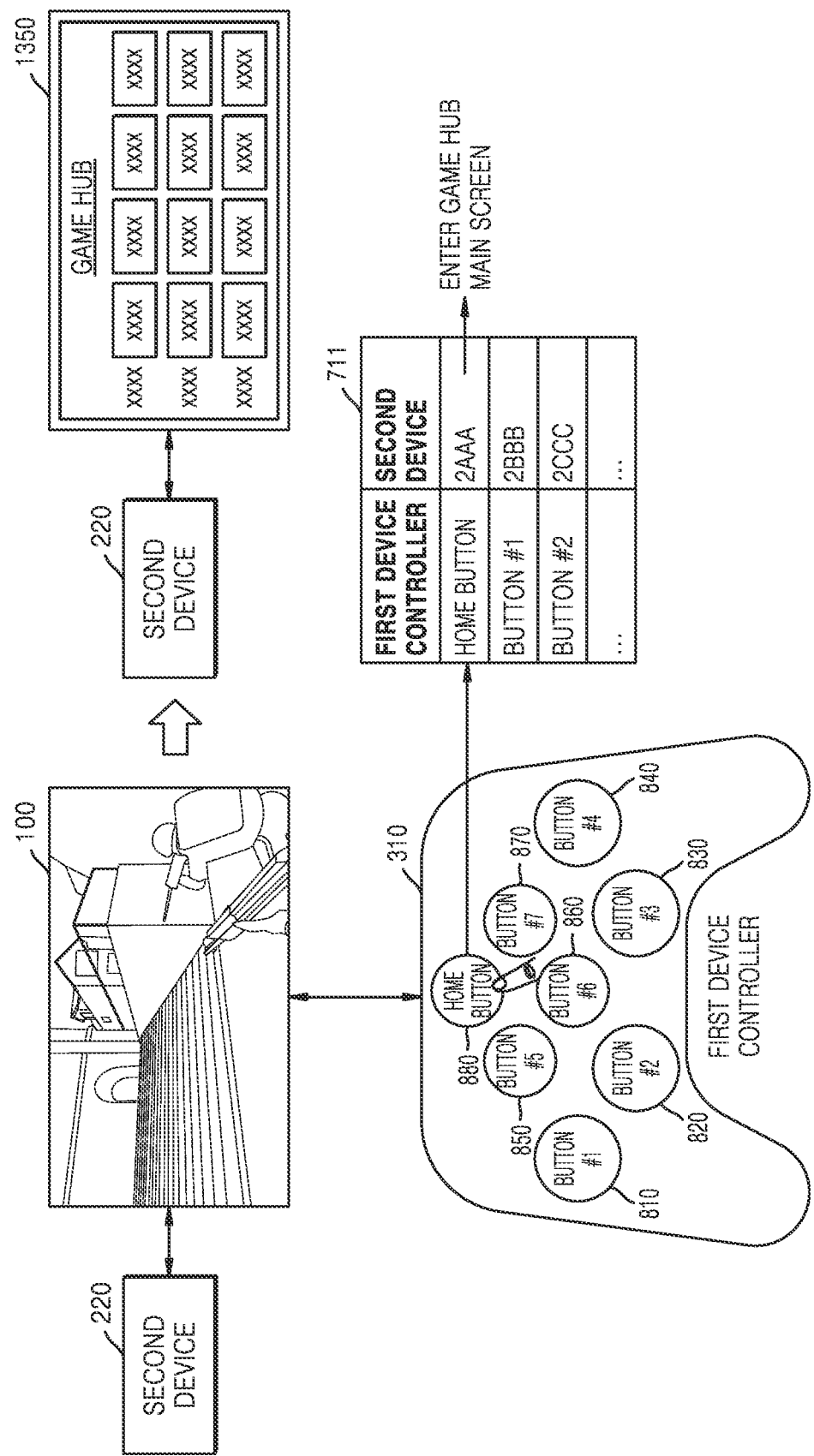
FIG. 17 is a diagram illustrating an example method of inducing access to a game hub screen provided by a display apparatus, according to various embodiments.

FIG. 17 is a diagram for describing an example of a method of inducing access to a game hub screen provided by the display apparatus 100, according to an embodiment of the disclosure.

Referring to FIG. 17, the display apparatus 100 is connected to the second device 220 and receives and displays game content from the second device 220. The first device controller 310 is connected to the display apparatus 100. A control signal corresponding to the home button on the first device controller 310 may be particularly set to induce access to the game hub screen. That is, the display apparatus 100 may set the home button on the first device controller 310 as a code corresponding to an operation of displaying the game hub home screen, to induce access to the game hub screen.

The display apparatus 100 may output the game hub home screen to the display in response to the control signal corresponding to the home button on the first device controller 310.

Some embodiments of the disclosure may be implemented as a recording medium including computer-executable instructions such as a computer-executable program module. A computer-readable medium may be any available medium which is accessible by a computer, and may include a volatile or non-volatile medium and a removable or non-removable medium. Also, the computer-readable media may include computer storage media. The computer storage media include both volatile and non-volatile, removable and non-removable media implemented in any method or technique for storing information such as computer readable instructions, data structures, program modules or other data.

The embodiments of the disclosure may be implemented as a software (S/W) program including instructions stored in a computer-readable storage medium.

The computer may invoke stored instructions from the storage medium and operate according to an embodiment of the disclosure based on the invoked instructions, and may include an electronic device according to the embodiments of the disclosure.

The computer-readable storage medium may be provided in the form of a non-transitory storage medium. Here, the term 'non-transitory' simply means that the storage medium is a tangible device, and does not include a signal, but this term does not differentiate between where data is semi-permanently stored in the storage medium and where the data is temporarily stored in the storage medium.

In addition, a control method according to the embodiments of the disclosure may be provided in a computer program product. The computer program product may be traded between a seller and a purchaser as a commodity.

The computer program product may include a S/W program and a computer-readable recording medium storing the S/W program. For example, the computer program product may include a product in the form of a software program electronically distributed (e.g., a downloadable application) through a manufacturer of a device or an electronic market (e.g., Google Play Store, App Store). For electronic distribution, at least part of the S/W program may be stored in a storage medium or temporarily generated. In this case, the storage medium may be a storage medium of a server of the manufacturer or a server of the electronic market, or a relay server that temporarily stores the S/W program.

The computer program product may include a storage medium of a server or a storage medium of a device, in a system including or consisting of the server and the device. Alternatively, when there is a third device (e.g., a smart phone) communicatively connected to the server or the device, the computer program product may include a storage medium of the third device. Alternatively, the computer program product may include the S/W program itself, which is transmitted from the server to the device or the third device or transmitted from the third device to the device.

In this case, one of the server, the device, and the third device may execute the computer program product to perform the method according to the embodiments of the disclosure. Alternatively, two or more of the server, the device, and the third device may execute the computer program product to execute the method according to the embodiments of the disclosure in a distributed manner.

For example, the server (e.g., a cloud server, an artificial intelligence server) may execute the computer program product stored in the server to control the device communicatively connected to the server to perform the method according to the embodiments of the disclosure.

In another example, the third device may execute the computer program product to control the device communicatively connected to the third device to perform the method according to the embodiments of the disclosure. When the third device executes the computer program product, the third device may download the computer program product from the server, and execute the downloaded computer program product. Alternatively, the third device may execute the computer program product provided in a preloaded state, and perform the method according to the embodiments of the disclosure.

Also, the terms described in the specification, such as " . . . er (or)", " . . . unit", " . . . module", etc., denote a unit that performs at least one function or operation, which may be implemented as hardware (e.g., circuitry) or software or a combination thereof.

The above-described description of the disclosure is provided only for illustrative purposes, and those of skill in the art will understand that the disclosure may be easily modified into other detailed configurations without modifying technical aspects and essential features of the disclosure. Therefore, it should be understood that the above-described embodiments of the disclosure are merely examples and are not limited. For example, the elements described as single entities may be distributed in implementation, and similarly, the elements described as distributed may be combined in implementation. It will also be understood that any of the embodiment(s) described herein may be used in conjunction with any other embodiment(s) described herein.

What is claimed is:

1. A display apparatus comprising:
 a display;
 a memory storing one or more instructions; and
 at least one processor configured to execute the one or more instructions stored in the memory to:
 identify a device controller activated on the display apparatus and a device activated on the display apparatus, each of the device controller and the device comprising circuitry,
 determine whether the identified device controller is compatible with the identified device,
 based on a determination that the identified device controller is compatible with the identified device, control a control signal from the device controller to be directly provided to the device, and
 based on a determination that the identified device controller is incompatible with the identified device, convert the control signal from the device controller into a control signal recognizable by the device, and control the converted control signal to be provided to the device.

2. The display apparatus of claim 1, wherein the processor is further configured to execute the one or more instructions to, based on detection of a predefined event, identify the device controller activated on the display apparatus and the device activated on the display apparatus, and
wherein the predefined event includes at least one of: detection of activation of the device controller, recognition of the device controller, detection of a change in selection of the device, recognition of the device, or detection of activation of a hub graphical user interface.

3. The display apparatus of claim 1, wherein the processor is further configured to execute the one or more instructions to perform a connection operation between the device controller and the display apparatus, and identify the device controller by obtaining identification information of the device controller received through the connection operation.

4. The display apparatus of claim 1, wherein the processor is further configured to execute the one or more instructions to identify the activated device by obtaining identification information of the activated device received through an operation for recognizing the device.

5. The display apparatus of claim 1, wherein the processor is further configured to execute the one or more instructions to determine whether the identified device controller is compatible with the identified device, based on identification information of the device controller and identification information of the device.

6. The display apparatus of claim 1, wherein the processor is further configured to execute the one or more instructions to determine whether the identified device controller is compatible with the identified device, based on identification information and version information of the device controller, and identification information and version information of the device.

7. The display apparatus of claim 1, wherein the memory is configured to store one or more conversion tables, as at least part of the one or more instructions, for converting a control signal from the device controller into a code recognizable by one or more devices that are incompatible with the device controller.

8. The display apparatus of claim 7, wherein the processor is further configured to execute the one or more instructions to, based on determining that the identified device controller is incompatible with the identified device comprising circuitry, convert a control signal from the device controller into a code recognizable by the device, based on a conversion table corresponding to the device controller and the device among the one or more conversion tables.

9. The display apparatus of claim 1, wherein the processor is further configured to execute the one or more instructions to, based on detection of a predefined event, identify the device controller activated on the display apparatus and the device activated on the display apparatus, and store control signal conversion configuration information including identification information of the activated device controller, identification information of the activated device, and a control signal conversion table for converting a control signal from the activated device controller into a code recognizable by the activated device.

10. The display apparatus of claim 9, wherein the processor is further configured to receive a control signal from the activated device controller, convert the control signal into a code recognizable by the activated device based on the stored control signal conversion configuration information corresponding to the activated device controller, and provide the code to the device.

11. An operating method of a display apparatus, the operating method comprising:
identifying a device controller activated on the display apparatus and a device activated on the display apparatus, each of the device controller and the device comprising circuitry;
determining whether the identified device controller is compatible with the identified device;
based on determining that the identified device controller is compatible with the identified device, controlling a control signal from the device controller to be directly provided to the device; and
based on determining that the identified device controller is incompatible with the identified device, converting the control signal from the device controller into a control signal recognizable by the device, and causing the converted control signal to be provided to the device.

12. The operating method of claim 11, further comprising:
based on detecting a predefined event, identifying the device controller activated on the display apparatus and the device activated on the display apparatus,
wherein the predefined event includes at least one of: detection of activation of the device controller, recognition of the device controller, detection of a change in selection of the device, recognition of the device, or detection of activation of a hub graphical user interface.

13. The operating method of claim 11, further comprising:
performing a connection operation between the device controller and the display apparatus; and
identifying the device controller based on identification information by obtaining identification information of the device controller received through the connection operation.

14. The operating method of claim 11, further comprising identifying the activated device based on identification information by obtaining identification information of the activated device received through an operation of recognizing the device.

15. The operating method of claim 11, further comprising determining whether the identified device controller is compatible with the identified device based on at least one of identification information or version information of the device controller, and also based on at least one of identification information or version information of the device.

16. The operating method of claim 11, further comprising storing one or more conversion tables for converting a control signal from the device controller into a code recognizable by one or more devices that are incompatible with the device controller.

17. The operating method of claim 16, further comprising, when it is determined that the identified device controller is incompatible with the identified device, converting a control signal from the device controller into a code recognizable by the device, based on a conversion table corresponding to the device controller and the device among the one or more conversion tables.

18. The operating method of claim 11, further comprising:
based on detecting a predefined event, identifying the device controller activated on the display apparatus and the device activated on the display apparatus; and
storing control signal conversion configuration information including identification information of the activated device controller, identification information of the activated device, and a control signal conversion table for converting a control signal from the activated device controller into a code recognizable by the activated device.

19. The operating method of claim 18, further comprising:
receiving a control signal from the activated device controller;
converting the control signal into a code recognizable by the activated device, based on the stored control signal conversion configuration information corresponding to the activated device controller, and providing the code to the device.

20. A computer-readable non-transitory recording medium having recorded thereon one or more programs executable by at least one processor of a display apparatus for implementing an operating method of the display apparatus, the operating method comprising:
identifying a device controller activated on the display apparatus and a device activated on the display apparatus;
determining whether the identified device controller is compatible with the identified device;
based on determining that the identified device controller is compatible with the identified device, controlling a control signal from the device controller to be directly provided to the device; and
based on determining that the identified device controller is incompatible with the identified device, converting the control signal from the device controller into a control signal recognizable by the device, and causing the converted control signal to be provided to the device.

* * * * *